(12) United States Patent
Herbert et al.

(10) Patent No.: US 11,412,884 B2
(45) Date of Patent: Aug. 16, 2022

(54) BEVERAGE PREPARATION SYSTEM

(71) Applicant: Kerry Luxembourg S.à.r.l., Luxembourg (LU)

(72) Inventors: John Michael Herbert, Winchester, MA (US); Bryan R. Hotaling, Harvard, MA (US); John A. MacNeill, Acton, MA (US); Scott A. Leclerc, Ashby, MA (US); Matthew Naples, Acton, MA (US); Patrick J. Devine, Townsend, MA (US)

(73) Assignee: KERRY GROUP SERVICES INTERNATIONAL LIMITED, Tralee (IE)

( * ) Notice: Subject to any disclaimer, the term of this patent is extended or adjusted under 35 U.S.C. 154(b) by 206 days.

(21) Appl. No.: 16/671,892

(22) Filed: Nov. 1, 2019

(65) Prior Publication Data
US 2020/0100616 A1 Apr. 2, 2020

Related U.S. Application Data

(62) Division of application No. 15/701,033, filed on Sep. 11, 2017, now Pat. No. 11,116,352.

(60) Provisional application No. 62/394,030, filed on Sep. 13, 2016.

(51) Int. Cl.
    A47J 31/40    (2006.01)
    A47F 1/08     (2006.01)
    (Continued)

(52) U.S. Cl.
    CPC ............ *A47J 31/402* (2013.01); *A23G 9/045* (2013.01); *A23G 9/12* (2013.01); *A23G 9/22* (2013.01);
    (Continued)

(58) Field of Classification Search
    CPC ........ A47J 31/402; A47J 31/405; A47J 31/41; A47J 31/4403; A23G 9/045; A23G 9/12;
    (Continued)

(56) References Cited

U.S. PATENT DOCUMENTS 1,634,566 A * 7/1927 Wessman ................ G07F 13/10
                                                    221/222
2,728,306 A * 12/1955 Tarr ........................ A23G 9/287
                                                    426/516
(Continued)

FOREIGN PATENT DOCUMENTS

WO    2011/094089 A1    8/2011

OTHER PUBLICATIONS

Invitation to Pay Additional Fees dated Nov. 23, 2017 from the International Searching Authority in counterpart International Application No. PCT/US2017/051262.

*Primary Examiner* — Jimmy Chou
(74) *Attorney, Agent, or Firm* — Sughrue Mion, PLLC

(57) ABSTRACT

A method of operating a beverage preparation machine that permits automated preparation of a variety of beverages. A plurality of stations add ingredients to a beverage container and process the contents directly in the container in some embodiments. Parallel preparation of more than one beverage may be performed in some embodiments. A robotic arm moves the beverage container to the stations. The robotic arm may include a weight sensor as part of controlling the addition of ingredients.

3 Claims, 34 Drawing Sheets

(51) Int. Cl.

| | |
|---|---|
| *A23G 9/12* | (2006.01) |
| *B67D 1/08* | (2006.01) |
| *A23G 9/04* | (2006.01) |
| *B67D 1/00* | (2006.01) |
| *A23G 9/22* | (2006.01) |
| *A47J 31/41* | (2006.01) |
| *A47J 31/44* | (2006.01) |

(52) U.S. Cl.
CPC ............ *A47F 1/085* (2013.01); *A47J 31/405* (2013.01); *A47J 31/41* (2013.01); *A47J 31/4403* (2013.01); *B67D 1/0041* (2013.01); *B67D 1/0857* (2013.01); *B67D 1/002* (2013.01); *B67D 1/0019* (2013.01); *B67D 1/0029* (2013.01); *B67D 1/0033* (2013.01); *B67D 1/0037* (2013.01); *B67D 1/0038* (2013.01); *B67D 2210/00097* (2013.01)

(58) Field of Classification Search
CPC ......... A23G 9/22; A47F 1/085; B67D 1/0041; B67D 1/0857; B67D 1/0019; B67D 1/002; B67D 1/0033; B67D 1/0037; B67D 2210/00097
USPC .................................................... 99/279, 327
See application file for complete search history.

(56) References Cited

U.S. PATENT DOCUMENTS

| | | | | |
|---|---|---|---|---|
| 3,530,907 | A * | 9/1970 | Slass | B67D 1/124 141/167 |
| 4,248,276 | A * | 2/1981 | Gosnell | A23G 9/283 141/192 |
| 4,426,017 | A * | 1/1984 | Ficken | B65G 59/102 221/222 |
| 4,889,210 | A * | 12/1989 | Alcaraz | A23G 9/28 186/38 |
| 4,949,526 | A * | 8/1990 | Brogna | B65B 7/2807 221/104 |
| 5,000,345 | A * | 3/1991 | Brogna | B67D 1/00 141/103 |
| 5,080,008 | A * | 1/1992 | Helbling | A47J 31/525 99/280 |
| 5,158,793 | A * | 10/1992 | Helbling | A47J 31/525 426/231 |
| 5,727,609 | A * | 3/1998 | Knight | B65G 47/901 141/104 |
| 6,053,359 | A * | 4/2000 | Goulet | B65B 43/44 221/221 |
| 6,102,246 | A * | 8/2000 | Goulet | B65G 1/133 221/11 |
| 6,607,013 | B1 * | 8/2003 | Leoni | B67D 1/0041 141/104 |
| 7,052,728 | B2 * | 5/2006 | Kateman | A23G 9/163 426/515 |
| 7,577,498 | B2 * | 8/2009 | Jennings | B25J 9/0084 141/100 |
| 7,757,896 | B2 * | 7/2010 | Carpenter | G07F 13/065 222/129.4 |
| 7,896,038 | B2 * | 3/2011 | Jones | A23G 9/245 141/103 |
| 9,141,562 | B2 * | 9/2015 | Pickett | B65B 7/2807 |
| 9,227,830 | B2 * | 1/2016 | Angus | B67D 1/0041 |
| 9,474,417 | B1 * | 10/2016 | Pryor, Jr. | A47J 43/0705 |
| 9,675,206 | B2 * | 6/2017 | Minard | G06F 3/04842 |
| 9,826,755 | B1 * | 11/2017 | Hsu | A23G 9/283 |
| 9,994,340 | B2 * | 6/2018 | Angus | B65B 1/32 |
| 10,395,464 | B2 * | 8/2019 | Van Den Driessche | G07F 13/10 |
| 10,414,179 | B2 * | 9/2019 | Leo | B41J 3/4073 |
| 2005/0002773 | A1 * | 1/2005 | Riesterer | B65G 59/107 414/795.6 |
| 2005/0207275 | A1 * | 9/2005 | Luedtke | B01F 13/002 366/343 |
| 2006/0037969 | A1 * | 2/2006 | Jennings | B25J 9/0087 222/129.1 |
| 2006/0043111 | A1 * | 3/2006 | Jennings | B25J 9/0087 222/129.1 |
| 2007/0106422 | A1 * | 5/2007 | Jennings | B25J 9/0087 700/245 |
| 2009/0069934 | A1 * | 3/2009 | Newman | B67D 1/0021 700/239 |
| 2009/0127277 | A1 * | 5/2009 | Douer | G07F 13/10 221/211 |
| 2010/0139493 | A1 * | 6/2010 | Nevarez | A47J 31/002 99/275 |
| 2011/0081462 | A1 * | 4/2011 | Meyrahn | A22C 17/0073 426/231 |
| 2011/0108569 | A1 * | 5/2011 | Jones | A23G 9/228 222/1 |
| 2011/0189358 | A1 * | 8/2011 | Herbert | A23G 9/22 426/231 |
| 2011/0220689 | A1 * | 9/2011 | Njaastad | F25C 5/187 222/639 |
| 2011/0235461 | A1 * | 9/2011 | Gursel | A47J 43/042 366/129 |
| 2011/0260828 | A1 * | 10/2011 | Zhang | B67D 1/124 340/5.1 |
| 2012/0087203 | A1 * | 4/2012 | Williams | B01F 15/00032 366/138 |
| 2012/0095595 | A1 * | 4/2012 | Krishnan | A21D 13/047 700/248 |
| 2013/0074980 | A1 * | 3/2013 | Crane | B65G 47/901 141/9 |
| 2013/0075426 | A1 * | 3/2013 | Crane | B67D 1/0894 222/129 |
| 2013/0192391 | A1 * | 8/2013 | Bruehwiler | G01N 35/0099 73/863.01 |
| 2013/0220480 | A1 | 8/2013 | Angus et al. | |
| 2013/0282164 | A1 * | 10/2013 | Veloo | G07F 13/10 700/216 |
| 2013/0344204 | A1 * | 12/2013 | Goodson | B01F 15/00253 426/231 |
| 2014/0001195 | A1 * | 1/2014 | Patterson | G07F 13/10 221/1 |
| 2014/0041748 | A1 * | 2/2014 | Angus | B67D 1/0041 141/1 |
| 2014/0120235 | A1 * | 5/2014 | Jones | A23G 9/28 426/565 |
| 2014/0125079 | A1 * | 5/2014 | Mukou | B21J 13/10 294/213 |
| 2014/0212566 | A1 * | 7/2014 | Herbert | A23G 9/045 426/590 |
| 2015/0114236 | A1 * | 4/2015 | Roy | A47J 44/00 426/231 |
| 2015/0216201 | A1 * | 8/2015 | Bruckner | G07F 17/0071 700/233 |
| 2015/0264959 | A1 * | 9/2015 | Colwell | A23G 9/228 241/25 |
| 2016/0229067 | A1 * | 8/2016 | Nishimura | B25J 13/085 |
| 2016/0260161 | A1 * | 9/2016 | Atchley | G06Q 30/0639 |
| 2017/0071228 | A1 * | 3/2017 | Ferraz Cury | G07F 9/023 |
| 2017/0172348 | A1 * | 6/2017 | Vu | B01F 13/0098 |
| 2017/0325621 | A1 * | 11/2017 | Herbert | A47J 31/521 |
| 2018/0056335 | A1 * | 3/2018 | Ogusu | B07C 5/36 |
| 2018/0281657 | A1 * | 10/2018 | Healey | G06Q 30/0241 |
| 2018/0368439 | A1 * | 12/2018 | Jones | A23G 9/228 |
| 2019/0022866 | A1 * | 1/2019 | Kawase | B25J 9/1633 |
| 2019/0062138 | A1 * | 2/2019 | Elmery | G06Q 20/18 |
| 2019/0166872 | A1 * | 6/2019 | Mathijssen | A23G 9/045 |
| 2020/0094997 | A1 * | 3/2020 | Menon | B65B 5/12 |
| 2020/0095001 | A1 * | 3/2020 | Menon | B65G 43/08 |
| 2020/0375388 | A1 * | 12/2020 | MacFarlane | G06Q 20/3224 |

* cited by examiner

FIG. 30

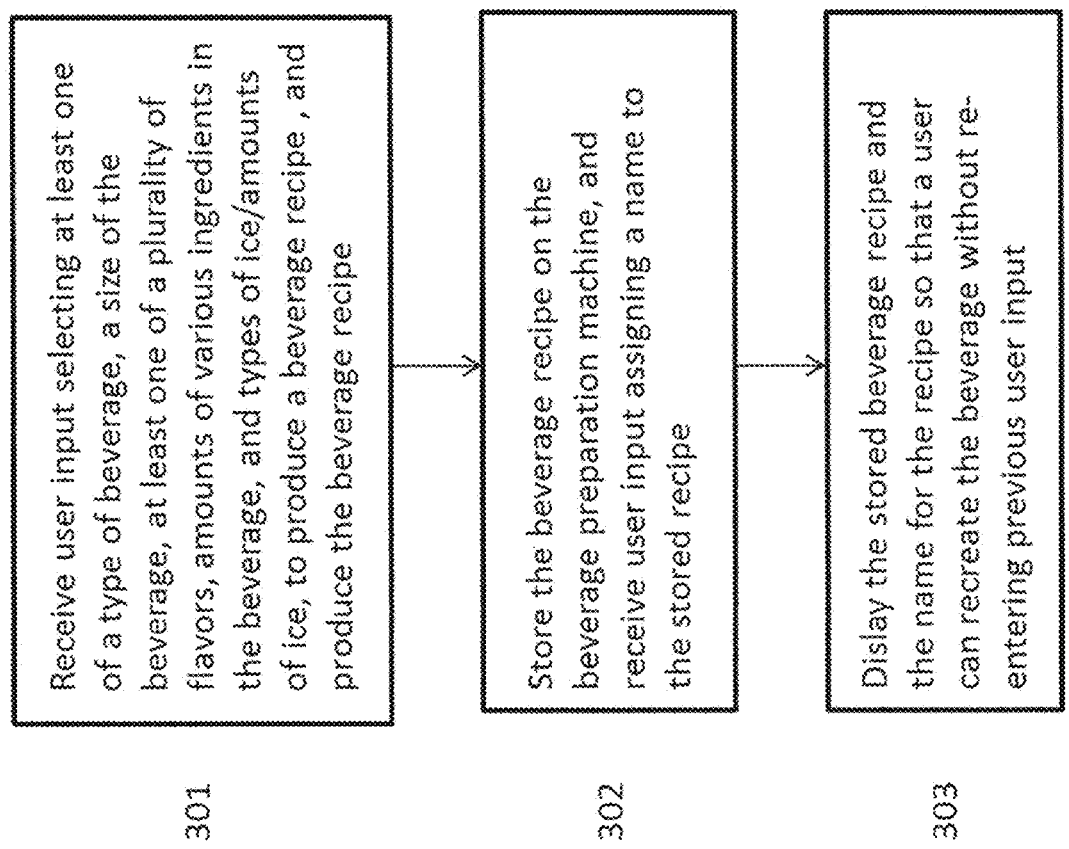

301 Receive user input selecting at least one of a type of beverage, a size of the beverage, at least one of a plurality of flavors, amounts of various ingredients in the beverage, and types of ice/amounts of ice, to produce a beverage recipe, and produce the beverage recipe 302 Store the beverage recipe on the beverage preparation machine, and receive user input assigning a name to the stored recipe 303 Dislay the stored beverage recipe and the name for the recipe so that a user can recreate the beverage without re-entering previous user input

BEVERAGE PREPARATION SYSTEM

CROSS REFERENCE TO RELATED APPLICATIONS

This is a divisional of U.S. patent application Ser. No. 15/701,033, filed Sep. 11, 2017, which claims the benefit of U.S. Provisional Patent Application No. 62/394,030, filed Sep. 13, 2016, the entire teachings and disclosure of which are incorporated herein by reference thereto.

DISCUSSION OF RELATED ART

Various beverage preparation machines prepare different types of beverages that are ready to serve. For example, combination blender and ice handling machines are often used to prepare frozen beverages. Other machines mix flavored syrups with water and other ingredients to create various beverages.

SUMMARY

According to one embodiment, a beverage preparation machine includes a first beverage preparation station configured to add an ingredient of a first type to a liquid container, a second beverage preparation station either configured to add an ingredient of a second type to the container and/or configured to process contents of the container, and a first gripper configured to grip the container while the container is moved from the first station to the second station.

According to another embodiment, a beverage preparation machine includes a container repository configured to hold a plurality of containers for liquid, a first beverage preparation station configured to add an ingredient of a first type to a container, a second beverage preparation station configured to process contents of the container, and a container mover configured to remove the container from the first station, move the container to the second station, and position the container within the second station at a location where processing components of the second station can process the contents of the container.

According to a further embodiment, a beverage preparation machine includes a first beverage preparation station configured to add an ingredient of a first type to a container, and a first gripper configured to grip and support the container while ingredients are added to the container at the first station. The machine further includes a robotic arm configured to move the first gripper, wherein the robotic arm includes a weight sensor to measure a weight of the container while the grip supports the container.

According to yet another embodiment, a device includes a storage region configured to hold a plurality of beverage containers that are stacked within one another, and an internal thread positioned at an end of the storage region and sized to move a beverage container rim through the thread as the thread rotates. The device also includes a drive which rotates the internal thread, wherein rotation of the internal thread by at least a threshold amount permits one of the beverage containers to be released from the internal thread.

According to another embodiment, a beverage preparation machine includes an ice source and an ice delivery chute having a longitudinal direction, the ice delivery chute positioned to convey ice along at least part of the distance between the ice source and a container. The machine also includes a plurality of deflectors positioned within the ice delivery chute, each deflector being oriented such that a respective deflection surface is oriented transverse to the longitudinal direction of the ice delivery chute.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 30 shows a flowchart for storing a customized recipe on the beverage preparation machine and displaying the recipe at a later time for reproduction.

DETAILED DESCRIPTION

Embodiments disclosed herein are directed to beverage formation systems, which in some embodiments include a beverage preparation machine capable of preparing a beverage with limited or no user intervention. For example, in some embodiments, a user, such as a customer, may place an order for a specific type and size of a beverage, and the beverage preparation machine will position a cup, add ice and various other ingredients, blend the contents directly in the cup, and then present the prepared beverage to the user in a pickup area.

In some embodiments, a robotic arm grips and moves a beverage container among several stations to prepare the beverage. More than one beverage may be prepared simultaneously in some embodiments. For example, while a first cup is having its contents blended by a blending station, a second cup may be receiving shaved ice at an ice station. Such an arrangement may permit a set of beverages to be prepared more quickly than serial preparation. In some embodiments, simultaneous preparation of multiple beverages with a single machine may allow for a higher utilization rate for various components of the machine.

Multiple robotic arms may be used in some embodiments, or a single robotic arm may be used to move the beverage containers through the beverage preparation process.

According to one aspect of the disclosure, a weight sensor may be incorporated within the robotic arm. In some cases, such an arrangement can facilitate control of the addition of ingredients to the beverage container. According to another aspect of the disclosure, the robotic arm could also include a volume sensor that measures an amount of liquid and/or ice inside the container.

According to another aspect of the disclosure, a rotary cup dispenser may be employed. The dispenser may release one cup at a time from a stack of nested cups by rotating the internal threads of an indexing wheel between cup rims.

The inventive concepts described herein can be implemented in any of numerous ways, and are not limited to any particular implementation techniques. Thus, while examples of specific implementation techniques are described below, it should be appreciated that the examples are provided merely for purposes of illustration, and that other implementations are possible. Any of the subassemblies described herein may be used in other machines and in any suitable combination.

Figure 1:
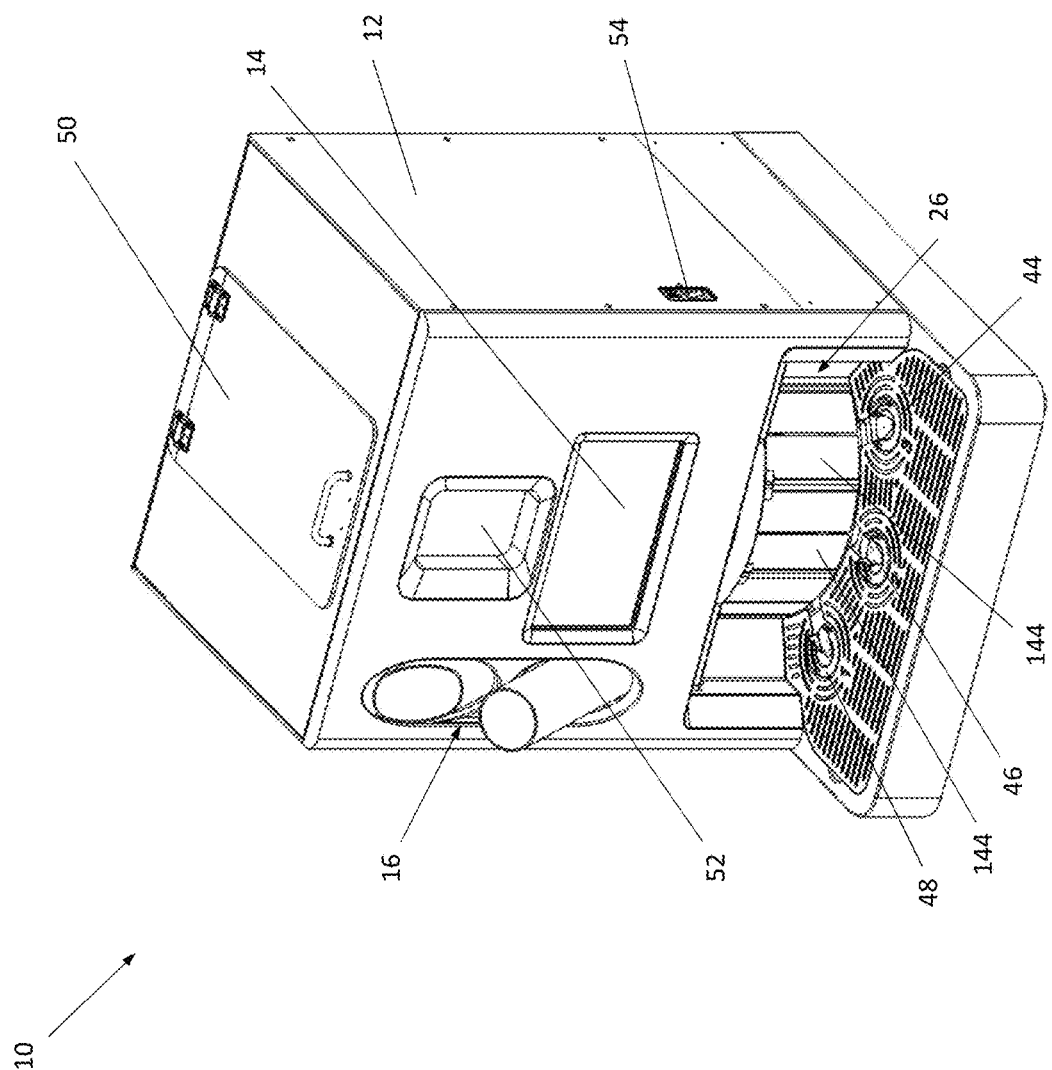
FIG. 1 shows a beverage preparation machine according to one embodiment.
Figure 2:
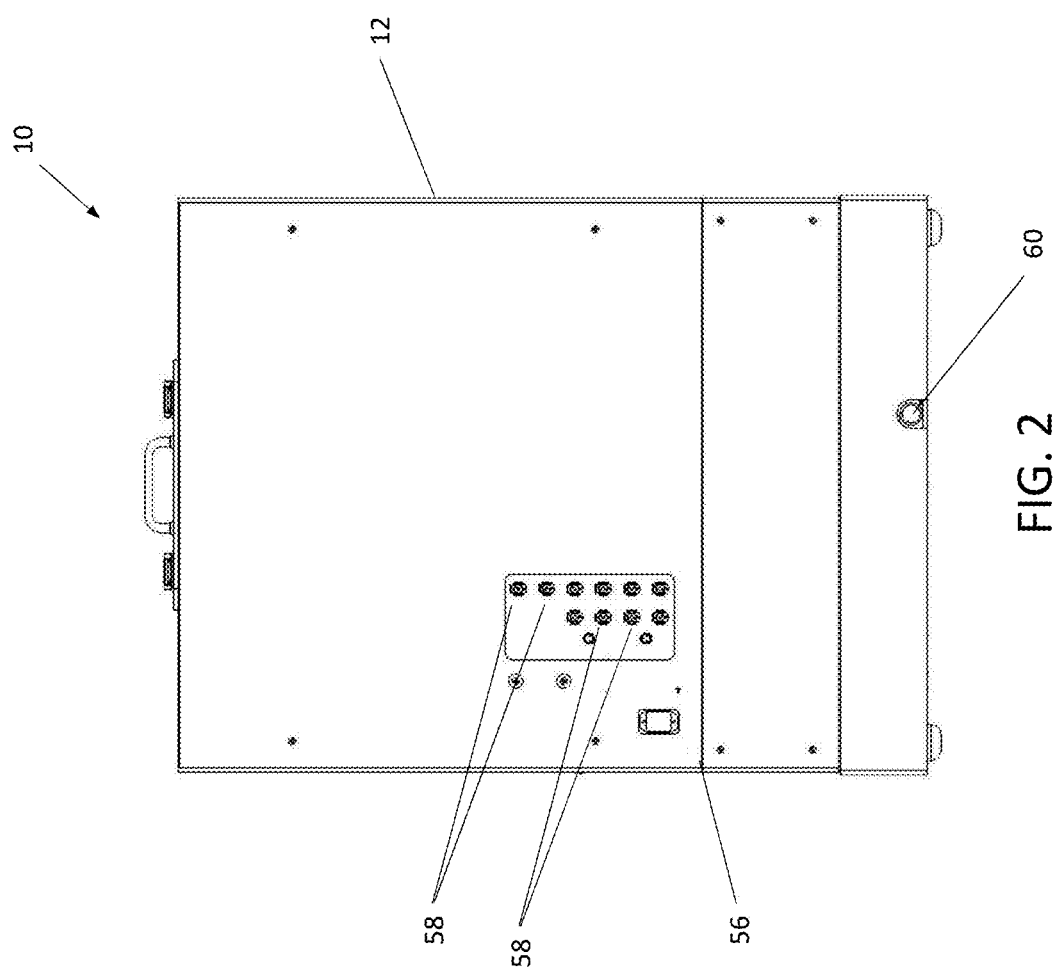
FIG. 2 is a rear view of the beverage preparation machine of FIG. 1.

Turning to the figures, FIGS. 1-2 show a beverage preparation machine 10 of one embodiment of the present disclosure. The beverage preparation machine 10 includes a housing 12 that is designed to support the working components of the machine. In some embodiments, the housing 12 includes a frame that is fabricated from sheet metal, such as stainless steel and/or aluminum, suitable to protect the working components of the machine. The beverage preparation machine 10 may include a controller 17 (see FIG. 3) which controls various operating assemblies and components of the machine. In some embodiments, the controller may be provided within a control panel or touch screen 14 on a front face of the housing 12. During operation, a user may use the control panel or touch screen 14 to select a particular type of beverage from various beverage options, which are described in more detail below. The beverage preparation machine 10 may prepare the selected beverage without any further user intervention in some embodiments.

Referring to FIGS. 3-9, the beverage preparation machine 10 may include several major assemblies. For example, the beverage preparation machine 10 shown in FIGS. 3-9 includes a container dispenser 16, which may dispense cups or other containers one at a time. The machine 10 also includes a container movement and positioning assembly 18. A cubed ice dispenser 20 is also included, as is an ingredient dispenser 22. A shaved ice dispenser and blending assembly 24 is provided. A container delivery assembly 26 delivers the prepared beverage to the user.

Figure 9:
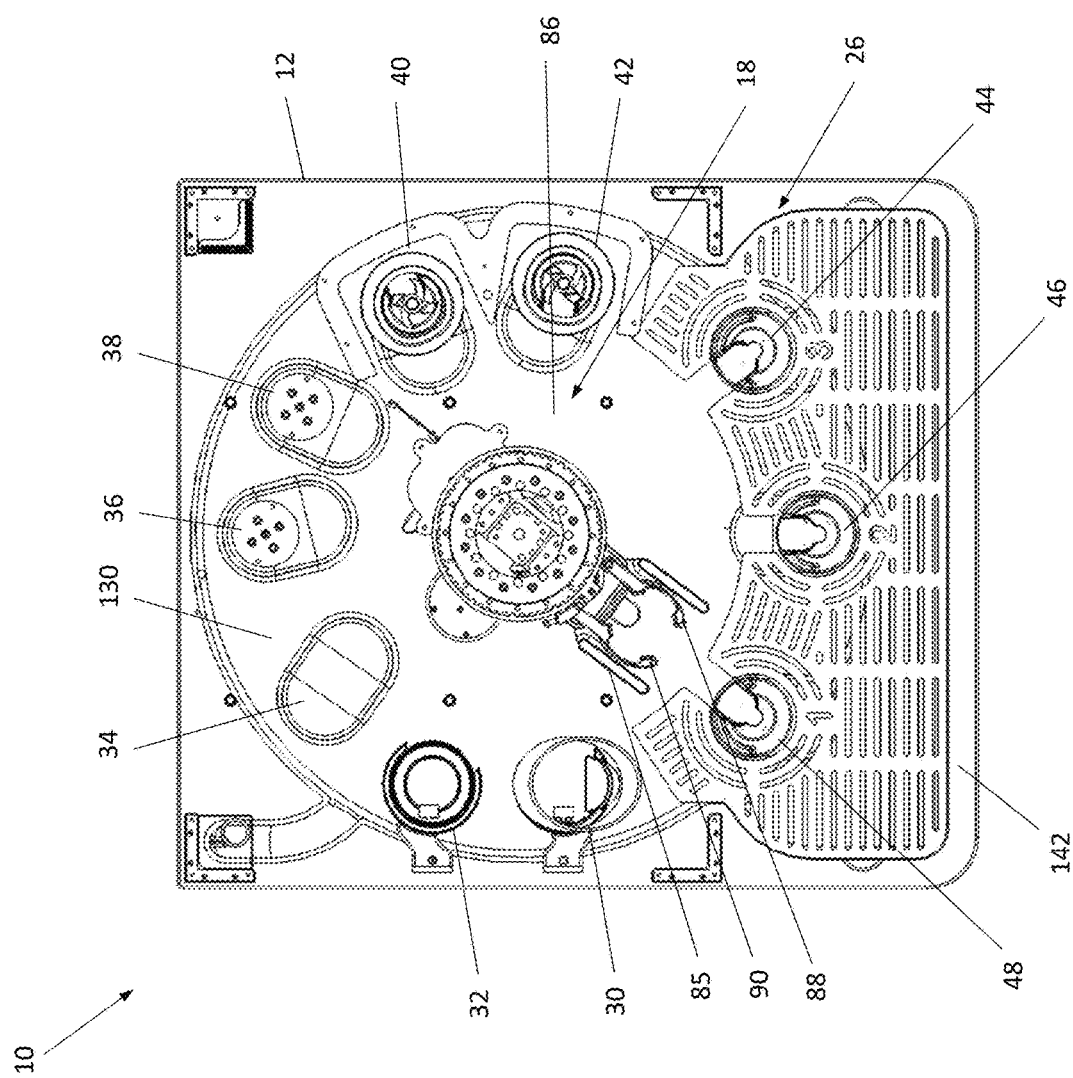
FIG. 9 is a top view of the beverage preparation machine with components removed to reveal container holders.
Figure 10:
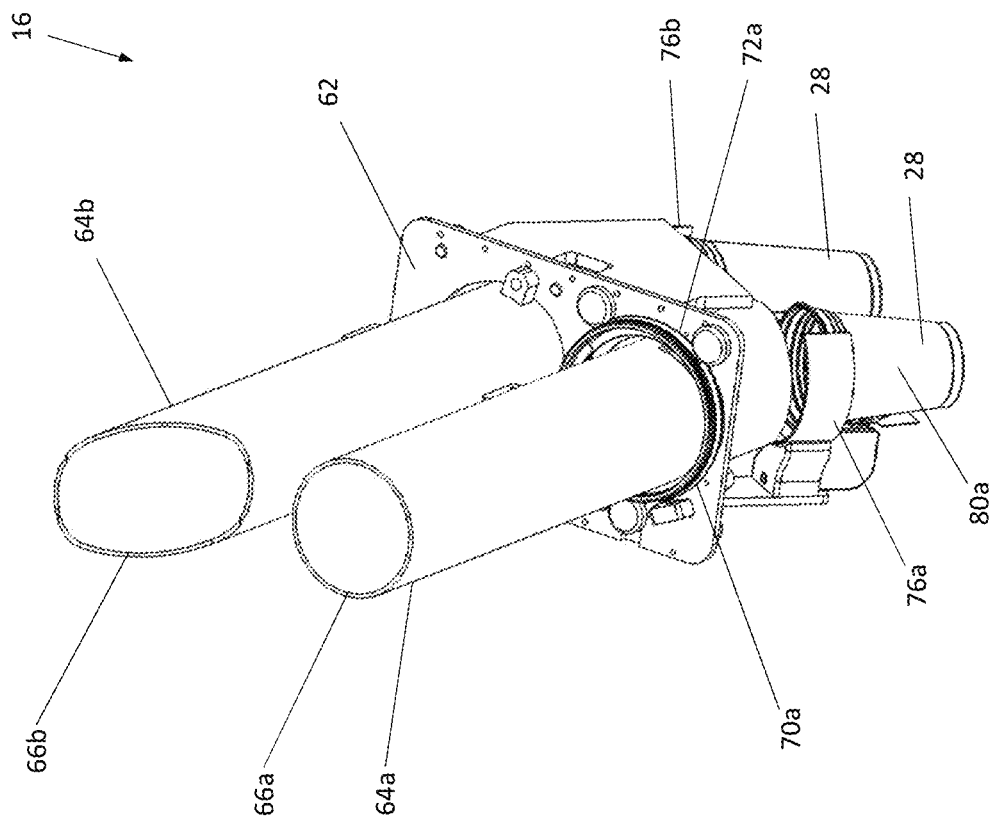
FIG. 10 shows a beverage container dispenser according to one aspect of the disclosure.
Figure 11:
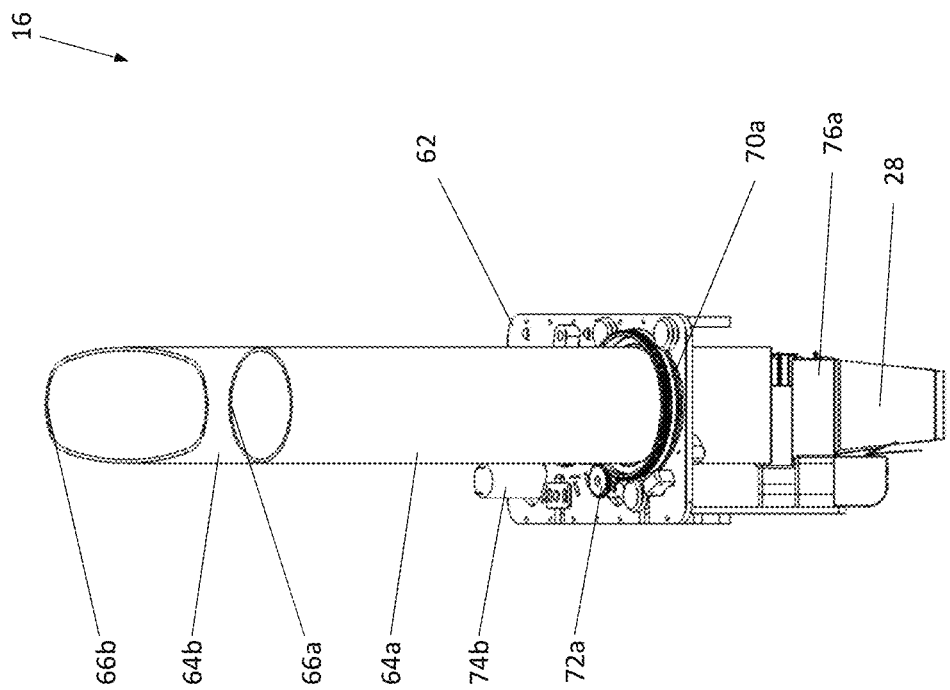
FIG. 11 is a front view of the beverage container dispenser shown in FIG. 10.
Figure 12:
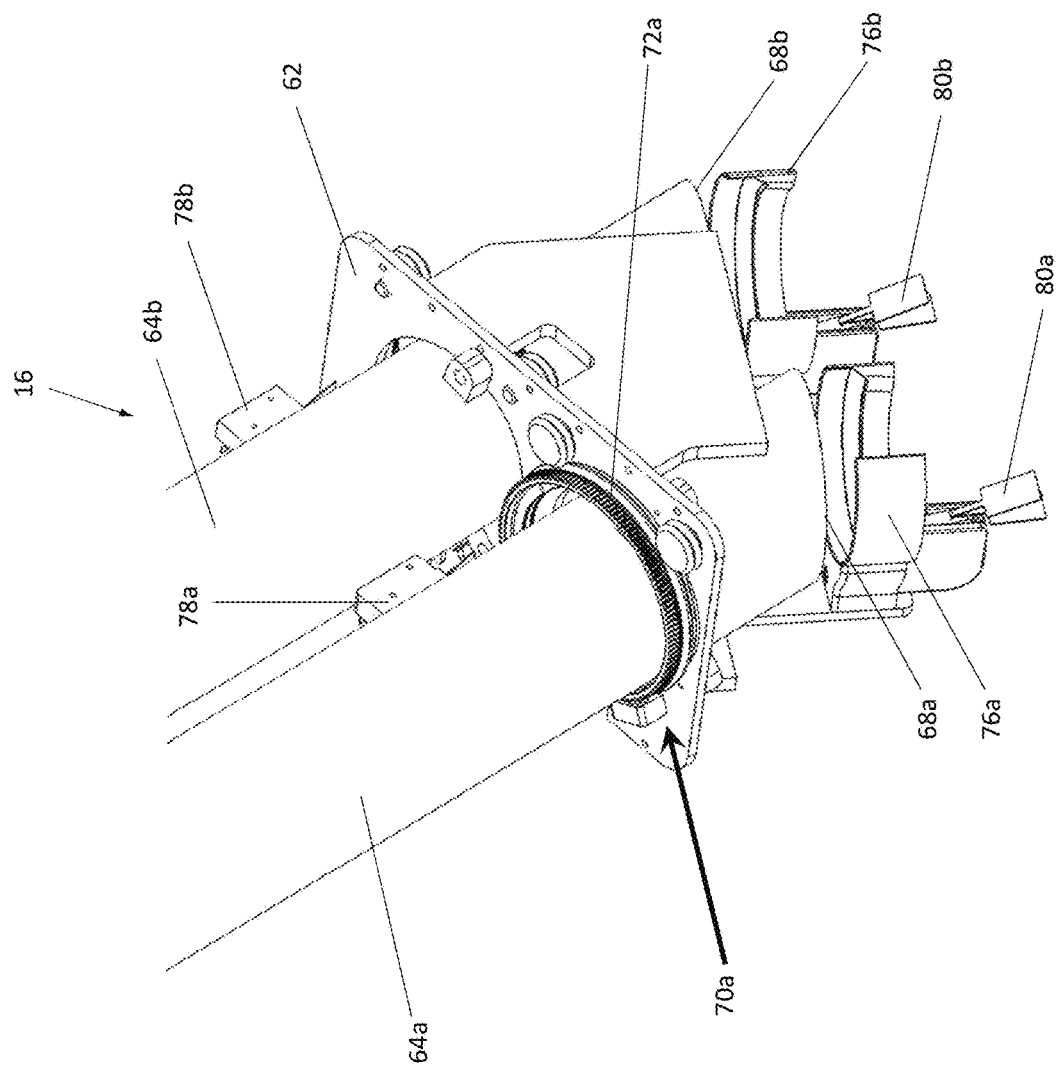
FIG. 12 is a perspective view of the beverage container dispenser.

Under the control of controller 17, the container dispenser 16 is configured to separate a single container 28 from a stack of containers and deposit the container to one of two container drop positions (see FIG. 9). The container movement and positioning assembly 18 is configured to move the container 28 to the different stations of the beverage preparation machine 10.

As will be discussed in greater detail below, the container movement and positioning assembly 18 includes a robotic arm which includes a gripper to grasp the container 28, and moves the container within the machine 10 among the different stations. The cubed ice dispenser 20 deposits cubed ice into the container 28 based on one or more options selected by the user. The ingredient dispenser 22 is configured to dispense one or more ingredients into the container 28 based on the one or more options selected by the user. The shaved ice dispenser and blending assembly 24 is configured to dispense shaved ice into the container and to blend the ingredients and shaved ice within the container 28. The container delivery assembly 26 is configured to present a prepared drink to the user. For purposes herein, the ice and water are considered to be an ingredient.

During beverage preparation, the container dispenser 16 deposits a container 28 to one of two positions 30, 32 associated with the container movement and positioning assembly 18. In one mode of operation, in which the beverage preparation machine 10 prepares an iced beverage, the container 28 is moved by the container movement and positioning assembly 18 to a cubed ice drop position 34 in which the cubed ice dispenser 20 deposits cubed ice into the container. Next, the container 28 is moved by the container movement and positioning assembly 18 to one of two positions 36, 38 associated with the ingredient dispenser 22 to dispense flavored product or products into the container. The container is moved by the container movement and positioning assembly 18 to the container delivery assembly 26 at one of three positions 44, 46, 48 in which the container is positioned to be accessible by the user. A user who retrieves the prepared beverage does not necessarily have to be the same user who input a beverage selection into the beverage preparation machine.

In another mode of operation, in which the beverage preparation machine 10 prepares a blended frozen beverage, the container 28 is moved by the container movement and positioning assembly 18 to one of two positions 36, 38 associated with the ingredient dispenser 22 to dispense flavored product or products into the container. Next, the container 28 is moved by the container movement and positioning assembly 18 to one of two positions 40, 42 associated with the shaved ice dispenser and blending assembly 24 to deposit shaved ice into the container and to blend the product(s) and shaved ice within the container. Once blended, the container 28 is moved by the container movement and positioning assembly 18 to the container delivery assembly 26 at one of the three positions 44, 46, 48 in which the container is positioned to be accessible by the user.

The controller may control the preparation of multiple beverages at the same time. For example the controller may instruct the robotic arm to move a first container from an ingredient addition station to a blending station, and while the first container is having its contents blended, the robotic arm may be moving a second container from a processing station to a serving area Before the blending of the first container has been completed, the robotic arm may move a third container to an ingredient addition station. In this manner, the robotic arm may be nearly continuously moving while multiple drinks are being prepared.

The beverage preparation machine embodiment illustrated in FIG. 1 includes an ice hopper lid 50, which can be opened to enable the user to deposit cubed ice into an ice hopper associated with the cubed and shaved ice dispenser 20. The machine 10 further includes an ice level window 52 to allow the user to check the ice supply level. The container dispenser 16 is accessible at a front of the machine adjacent the control panel or touch screen 14 to load containers such as cups. The container delivery assembly 26 delivers beverages to the user in a user-accessible region. An on/off switch 54 is provided on a side of the housing 12 of the machine 10. As shown in FIG. 2, the machine further includes an IEC connector 56, a plurality of ingredient inlet connectors 58, and a drain port 60, each of which is described in greater detail below.

Figure 3:
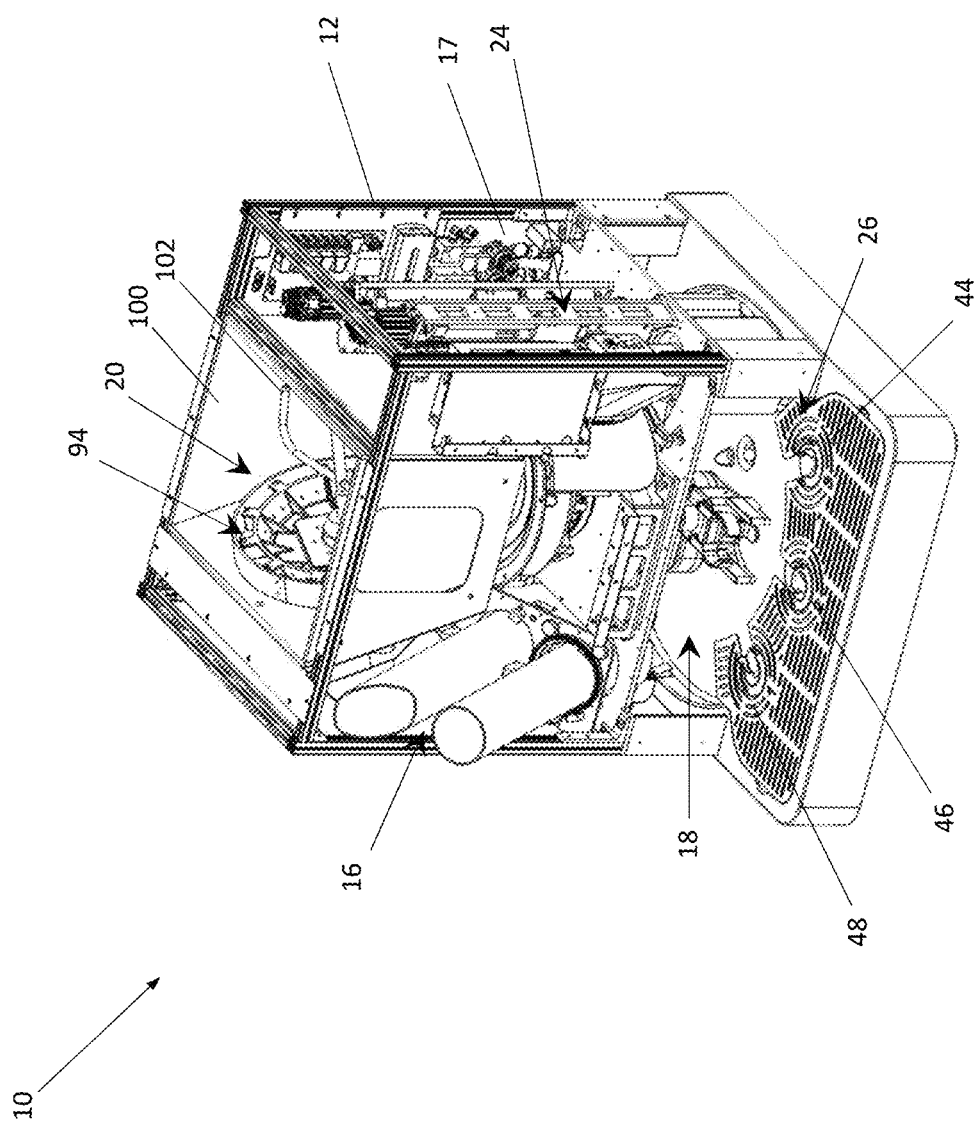
FIG. 3 shows the beverage preparation machine with its outer housing removed.
Figure 4:
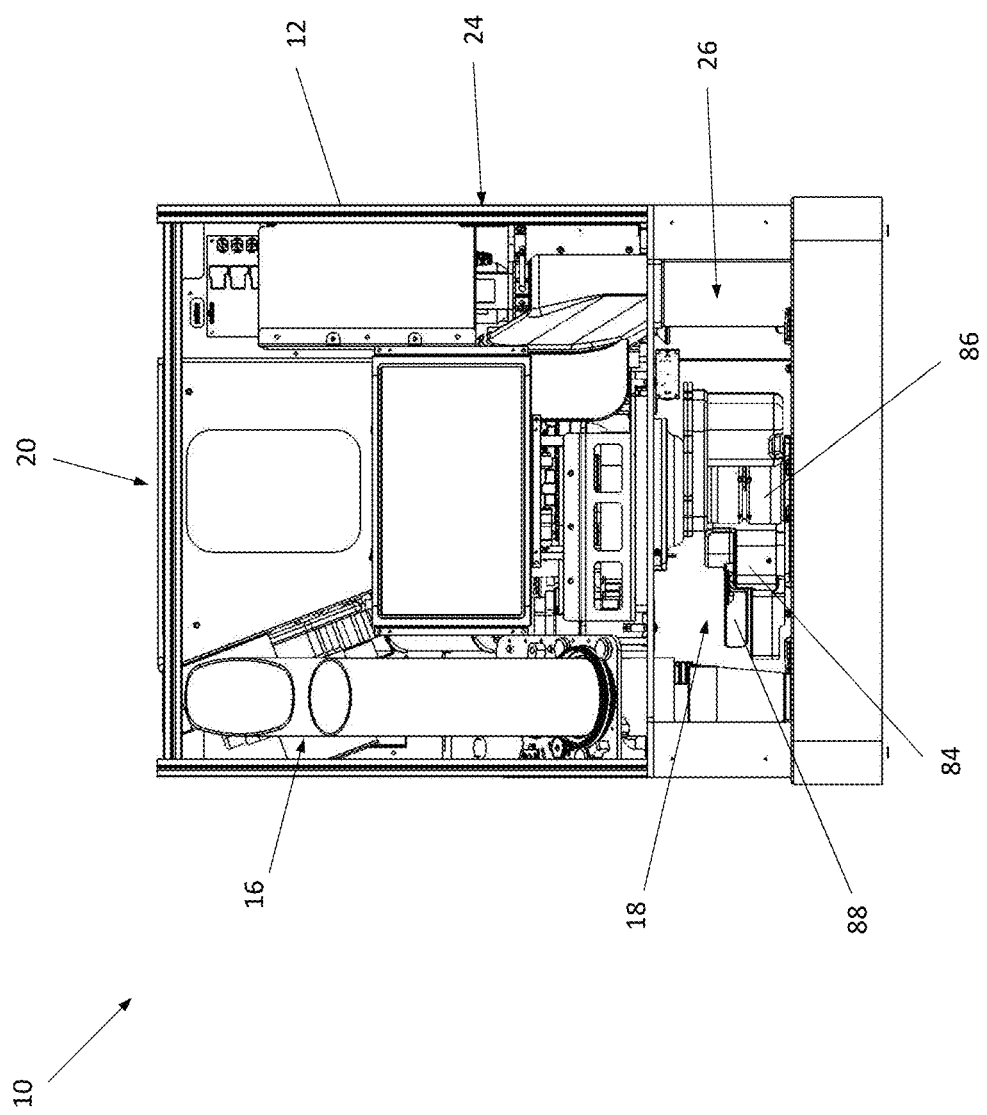
FIG. 4 is a front view of the beverage preparation machine shown in FIG. 3.
Figure 5:
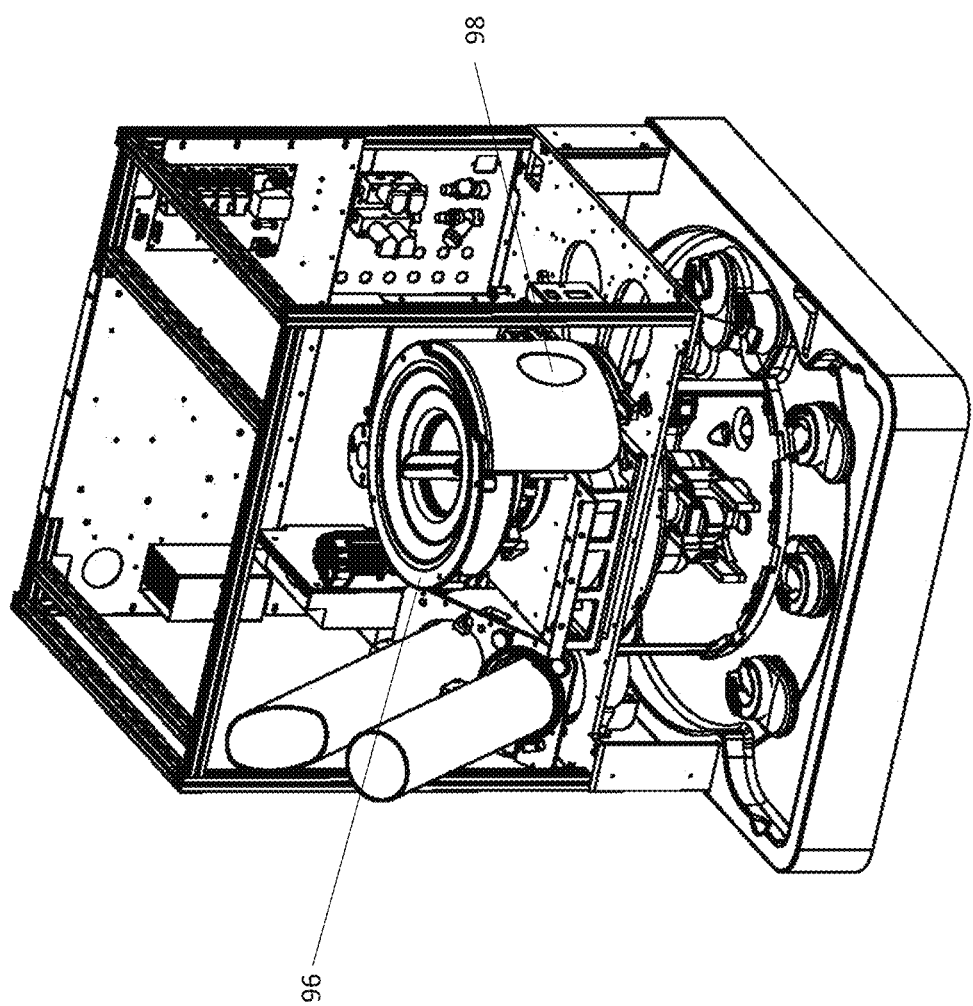
FIG. 5 shows the beverage preparation machine of FIG. 3 with the ice hopper removed.
Figure 6:
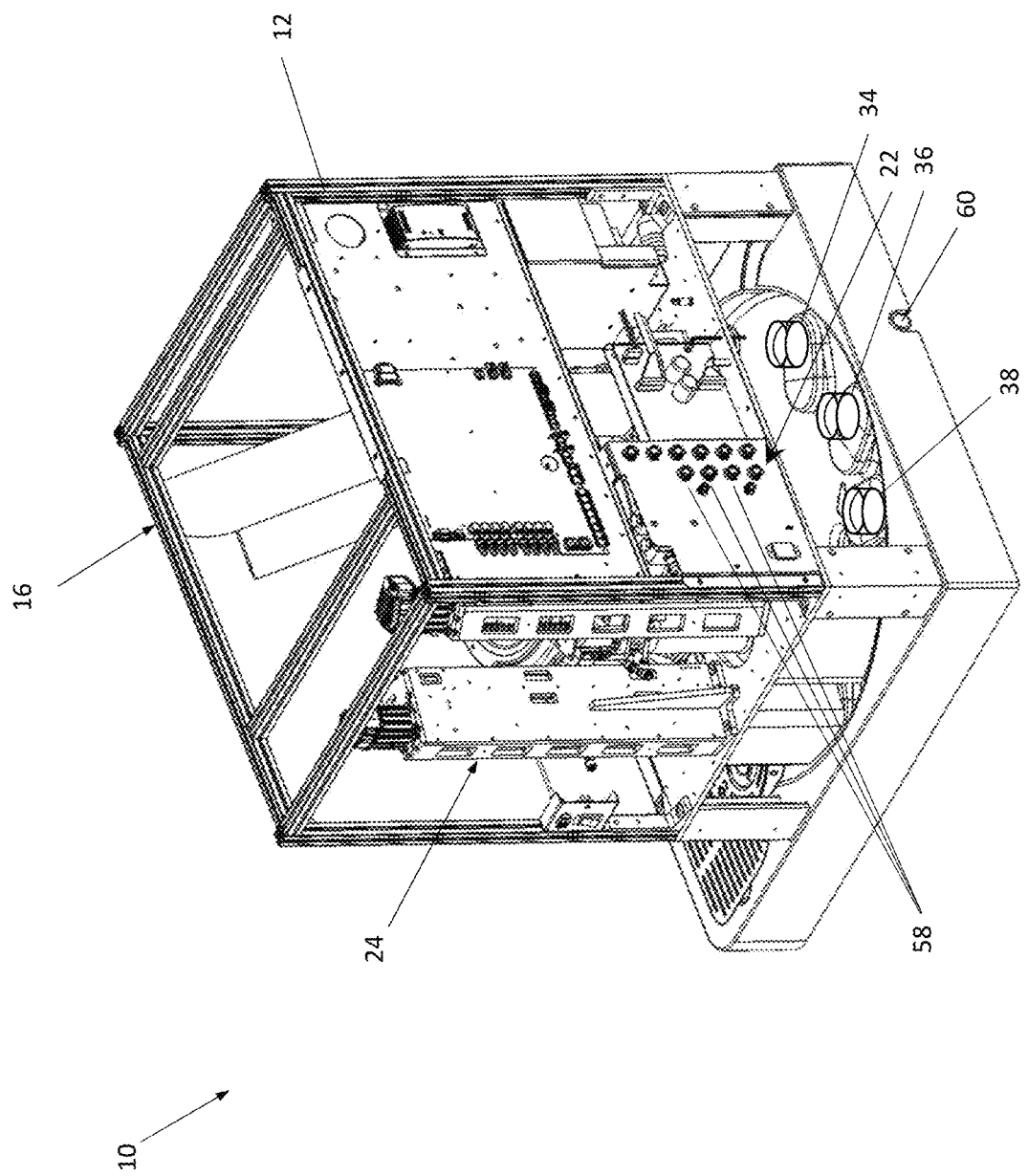
FIG. 6 is a rear perspective view of the beverage preparation machine shown in FIG. 5.

Referring to FIGS. 3 and 4, and additionally to FIGS. 10-13, as mentioned above, the container dispenser 16 is supported by the housing 12 of the machine 10 and configured to hold stacks of a stack of containers and to dispense individual containers. In one embodiment, the controller controls the container dispenser 16. As shown, the container dispenser 16 includes a support plate 62 secured to the housing 12 and two cylindrical tubes 64a, 64b mounted to the support plate. Each tube 64a, 64b has a first open end 66a, 66b at the top of the tube to receive a stack of containers and a second open end 68a, 68b (see FIG. 13) at the bottom of the tube through which individual containers are dispensed. In some embodiments, one tube, e.g., tube 64a, may include a first size of cups, e.g., 12-ounce cups, and the other tube, e.g., tube 64b, may a second, different size of cups, e.g., 16-ounce cups. In other embodiments, the container dispenser 16 may include additional tubes provided to offer cups of additional sizes to the user.

Figure 13:
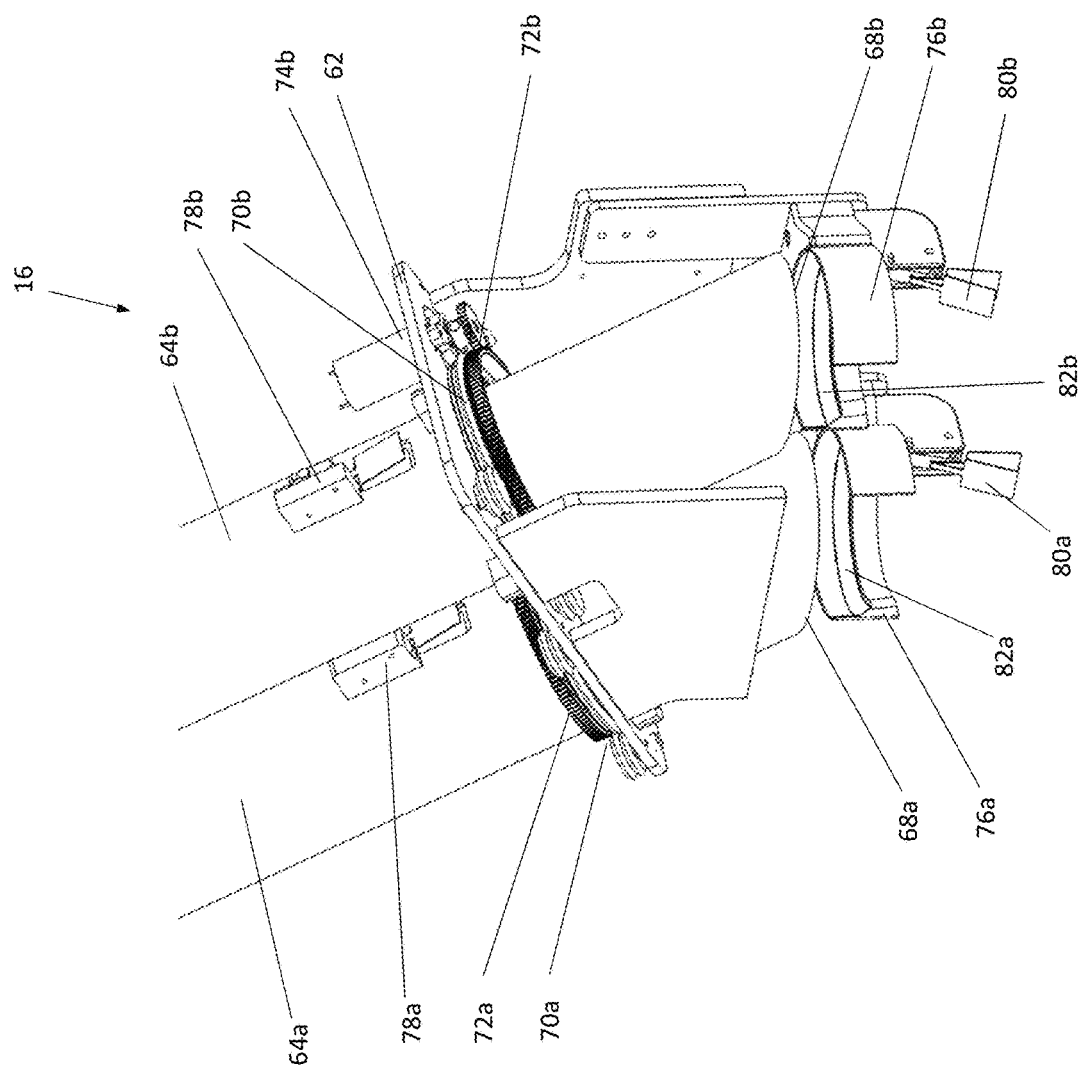
FIG. 13 is another perspective view of the beverage container dispenser.
Figure 14:
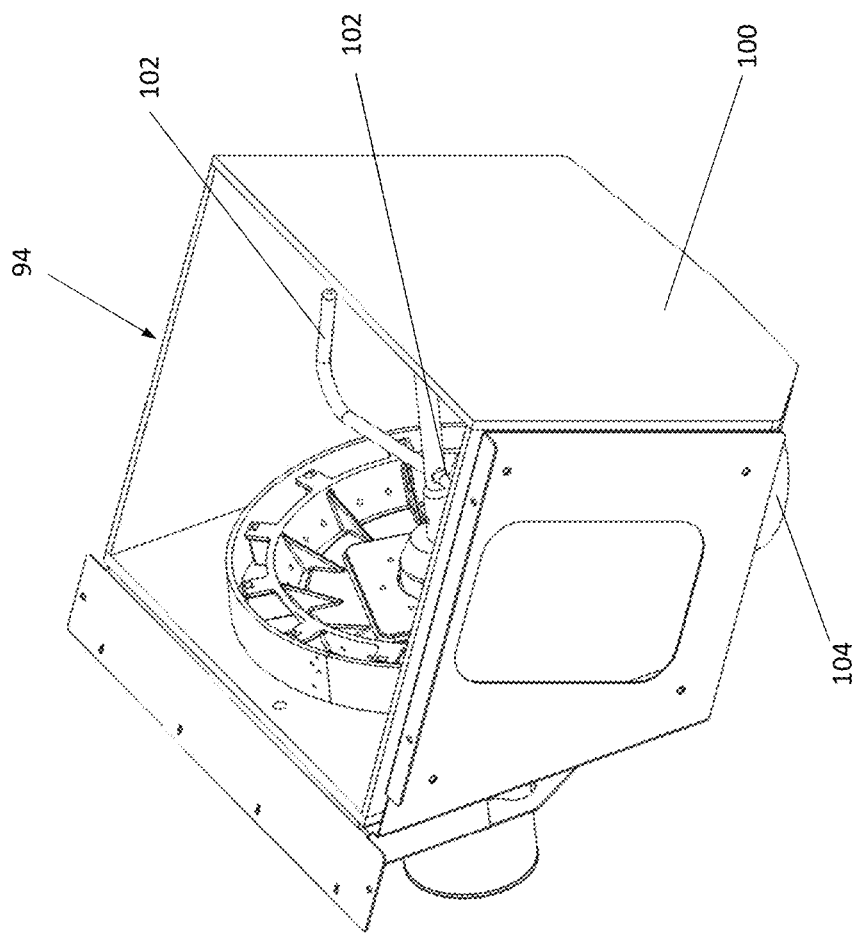
FIG. 14 shows one embodiment of an ice hopper.

For each of tubes 64a, 64b, the containers are prevented from sliding out of the second, open end of the tube by one of two rotary container dispensers 70a, 70b. For example, rotary container dispenser 70a includes an internal screw thread which releasably engages a rim of the lowermost container within the stack of containers. As shown, for tube 64a, the rotary container dispenser 70a is positioned on an upper surface of the support plate 62 (FIG. 10), and for tube 64b, the rotary container dispenser 70b is positioned on a lower surface of the support plate (FIG. 13). Though the rotary container dispensers may be positioned in any suitable manner.

Each rotary container dispenser 70a, 70b includes a gear assembly 72a, 72b driven by an electric motor (e.g., motor 74b for gear assembly 72b) mounted on the support plate 62. Each gear assembly 72a, 72b is configured to index a single container 28 within the tube 64a, 64b to release the container. Once released, the container 28 travels through a bottom portion of the tube 64a, 64b to a container yoke 76a, 76b positioned underneath the bottom open end 68a, 68b of the tube. For each tube 64a, 64b, the container dispenser 16 further includes a refill detection switch 78a, 78b to detect whether the supply of containers needs to be refilled. The container dispenser 16 further includes a drop detection switch 80a, 80b to detect the presence of the container 28 within the container yoke 76a, 76b. Any suitable sensor may be used to detect the presence of the container to confirm that the container has been placed.

Figure 8:
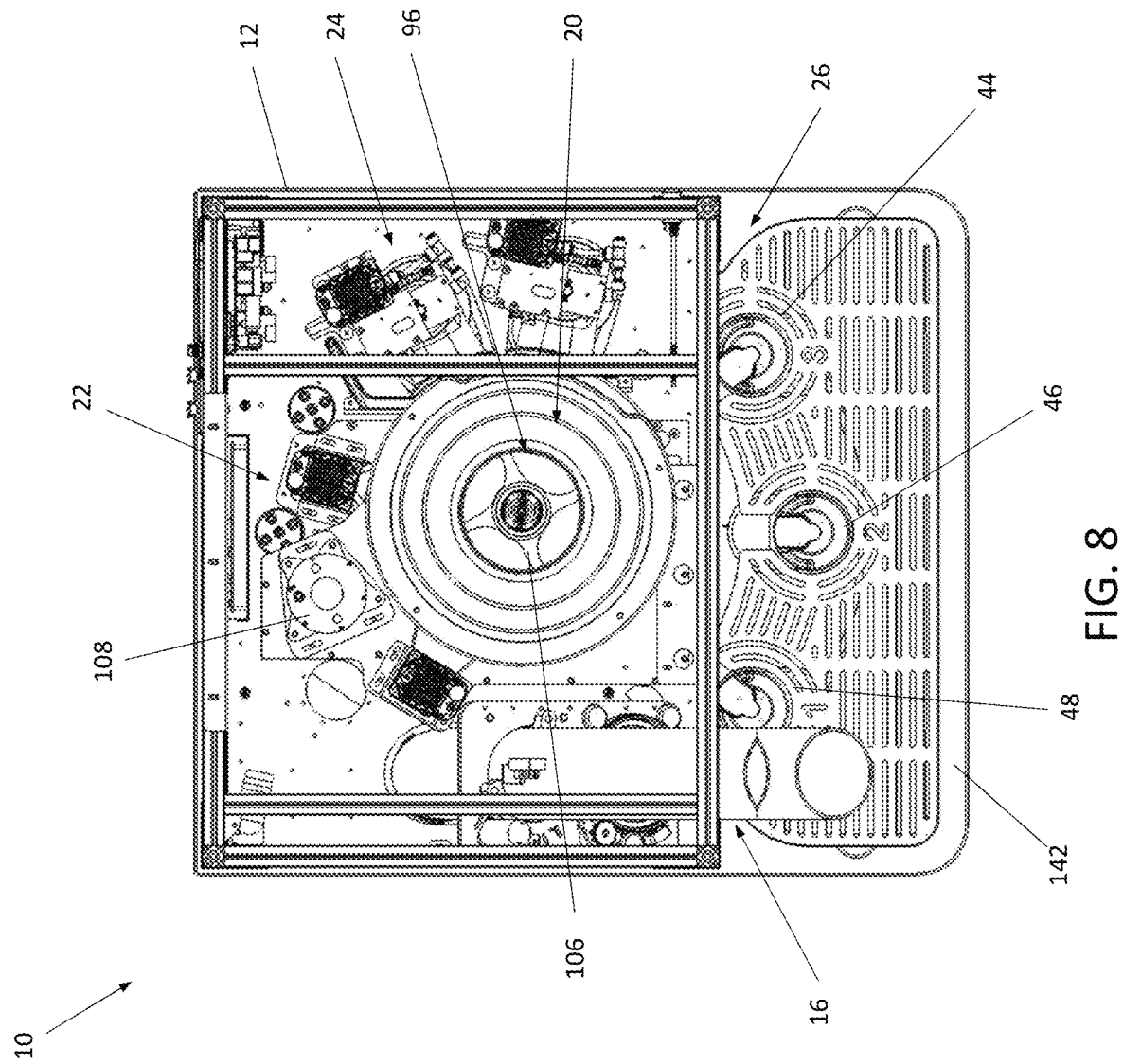
FIG. 8 is a top view of the beverage preparation machine with a top panel removed.

Each container yoke 76a, 76b is sized to receive and support the container deposited by its respective tube 64a, 64b. As shown, each container yoke 76a, 76b includes a curved structure having an inwardly projecting rim 82a, 82b sized to engage the rim of the container 28. The arrangement is such that when the lowermost container is lowered to the container yoke 76a, 76b, the rotary container dispenser 70a, 70b engages a rim of a next lowermost container to maintain that container in a supported position, thereby supporting the entire stack of containers within the tube 64a, 64b. In another embodiment, each container yoke 76a, 76b may be designed to accommodate containers of different sizes. For example, each container yoke 76a, 76b may include spring-loaded fingers which are configured to grasp containers having a variety of different diameters. During the initiation of a dispense operation, the container dispenser 16, under the control of the controller, dispenses a single container 28, e.g., a disposable cup, into the container yoke 76a, 76b of the container dispenser. As shown in FIGS. 8 and 9, the containers are dropped into one of two container drop positions depending on which tube 58a, 58b is dispensing the containers.

Figure 24:
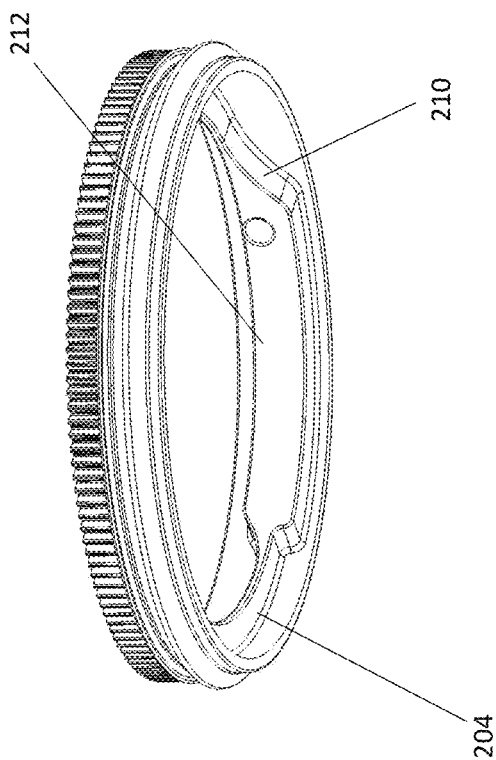
FIG. 24A shows a component of a rotary beverage container dispenser according to one embodiment of the disclosure.
FIG. 24B shows the component of FIG. 24A from an opposite direction.
Figure 24:
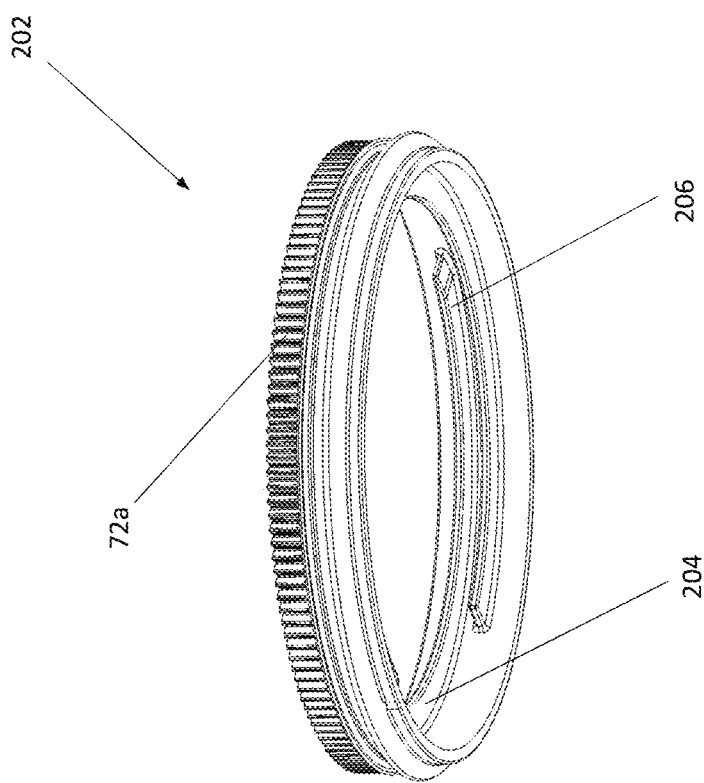

Some embodiments of a rotary container dispenser include a rotating ring 202 shown in FIGS. 24A and 24B. FIGS. 24A and 24B show the same ring from opposite sides. A gear assembly 72a may be used to rotate ring 202, though any suitable manner of rotating may be employed. The ring includes an internal thread 204 with a leading edge 206. A stack of containers, such as a stack of cups, are supported by the thread 204. When it is desired to dispense a cup, the ring rotates and leading edge 206 travels between the upper rim of the bottommost cup and the rim of the cup stacked directly on top of the bottommost cup. As the ring continues to rotate, a leading ramp 210 of separation portion 212 pushes the two cups apart and forces the bottommost cup to be release from the thread 204.

This rotary dispenser may be used in other systems or machines, and is not limited to use with beverage preparation machines described herein.

According to some embodiments, container dispensers are used which are not rotary dispensers. In still other embodiments, controlled dispensers are not used; instead, a user manually places cup at an initial station.

Referring to FIGS. 4, 9 the container movement and positioning assembly 18 includes a robotic arm 84 rotatably coupled to the housing 12 by a rotor assembly 86 such that the robotic arm rotates about a central axis A. The robotic arm includes a gripper 85 to move the container 28 within the machine 10. In one mode of operation, when preparing an iced beverage, the container movement and positioning assembly 18 is configured to sequentially move the container 28 from the container dispenser 16 to the cubed and shaved ice dispensing assembly 20, to the ingredient dispenser 22, and to the container delivery assembly 26. In another mode of operation, when preparing a frozen beverage, the container movement and positioning assembly 18 is configured to sequentially move the container 28 from the container dispenser 16 to the ingredient dispenser 22, to the shaved ice dispensing and blending assembly 24, and to the container delivery assembly 26. The gripper 85 of the robotic arm 84 grips a portion of the container 28 below the rim of the container, though any suitable grip location or gripper may be used.

In some embodiments, the gripper 85 includes a pair of fingers 88, 90, which are moved toward and away from one another and radially in and out with respect to the central axis A by a motor 92 linked to the controller. The fingers 88, 90 grip a body of the container 28 with a force sufficient to support and move the container and its contents. During operation, for example when moving the container 28 from the container dispenser 16 to the cubed and shaved ice dispensing assembly 20, the fingers 88, 90 are moved away from each other and the robotic arm is extended from a retracted position to an extended position toward the container. Once the fingers surround the container 28, the fingers 88, 90 move toward one other to grip the container. The rotor assembly 86 then rotates the robotic arm 84 from the existing station, e.g., the container dispenser 16, to the next station, e.g., the cubed and shaved ice dispensing assembly 20. This process is repeated to move the container 28 from station-to-station until the beverage is prepared.

Referring to FIGS. 14, 15, 16A and 16B, the beverage container movement and positioning assembly 18 of the machine 10 is configured to move the container 28 from the container dispenser 16 to the cubed and shaved ice dispensing assembly 20. In some embodiments, the controller controls the cubed and shaved ice dispensing assembly 20, and the assembly 20 includes an ice hopper 94 to hold cubed ice. The ice hopper 94 includes a bin 100 and a pair of rotatable tines, each indicated at 102, secured to the bin, with the tines being configured to rotate the cubed ice to prevent the cubed ice from jointing together to form large blocks of ice. In one embodiment, cubed ice can be manually deposited into the bin 100 of the ice hopper 94 through the ice hopper lid 50. In another embodiment, an ice maker can be positioned above the machine 10 to provide cubed ice automatically into the bin 100 of the ice hopper 94.

Figure 7:
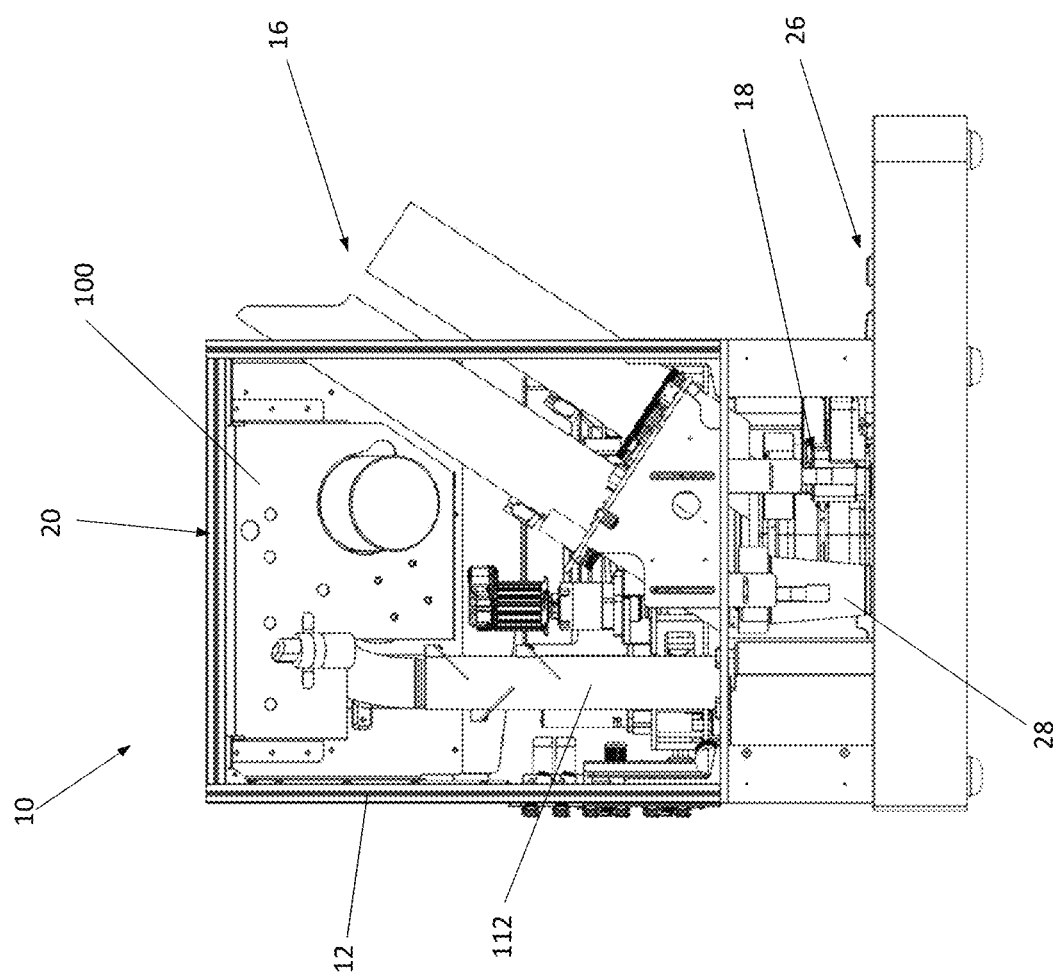
FIG. 7 is a side view of the beverage preparation machine with portions of the housing removed.
Figure 15:
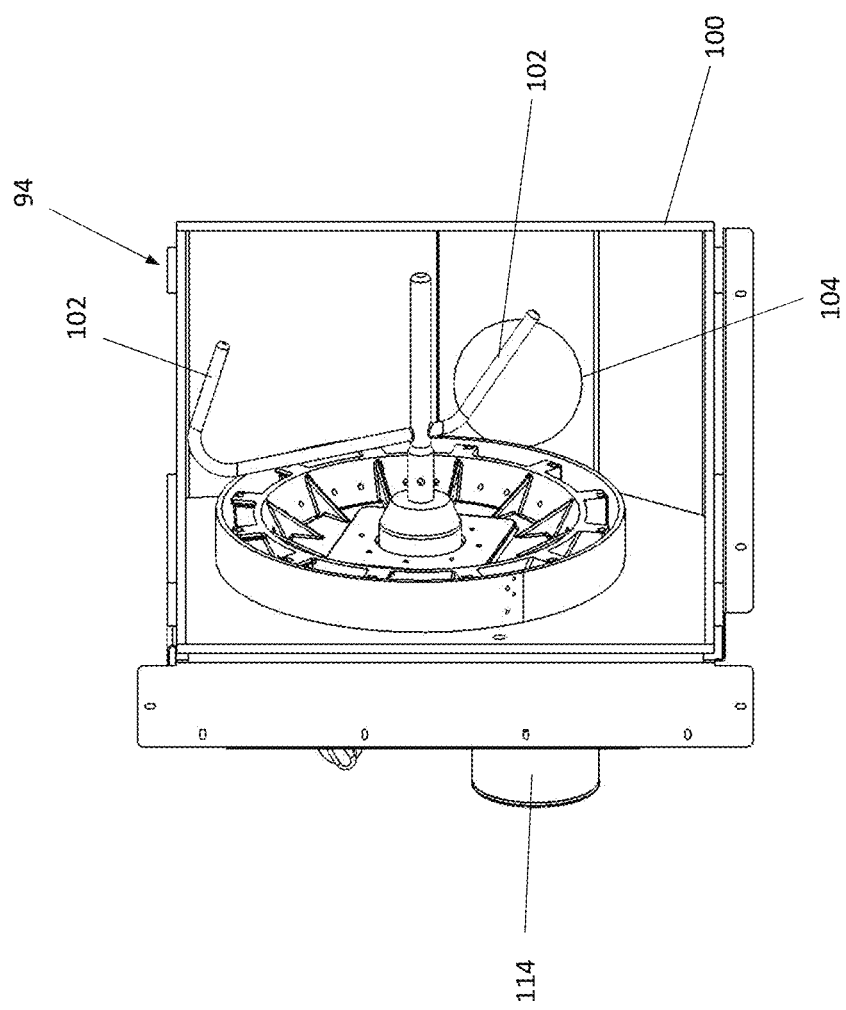
FIG. 15 is a top view of the ice hopper shown in FIG. 14.

Referring to FIGS. 7 and 15, when depositing cubed ice into the beverage container 28 at the cubed ice drop position 34, the cubed ice may travel through a port 114 into a tube 112 and then into the container 28. The ice hopper 94 may be indexed in some embodiments to add precise amounts of cubed ice to the container 28. For example, a rotating agitator may be configured to rotate by a specific angle to dispense a certain amount of ice from the ice hopper 94. In some embodiments, a sensor, such as a weight sensor, may sense the amount of ice in a container, and if more ice is desired, the controller may instruct the ice hopper to deliver another indexed amount of ice.

In some embodiments, assembly 20 may be capable of providing shaved ice to the beverage container 28. The assembly may include an ice shaver 96 which is positioned underneath the ice hopper 94 to deposit shaved ice into the container through an exit port 98. As shown, cubed ice is deposited into the ice shaver 96 through an opening 104 formed in the bin 100. The ice hopper 94 and the ice shaver 96 may be indexed to provide precise amounts of shaved ice to the container 28 in some embodiments. Once ice reaches the ice shaver 96, the ice shaver shaves the ice and deposits the ice in the container 28.

Figure 16:
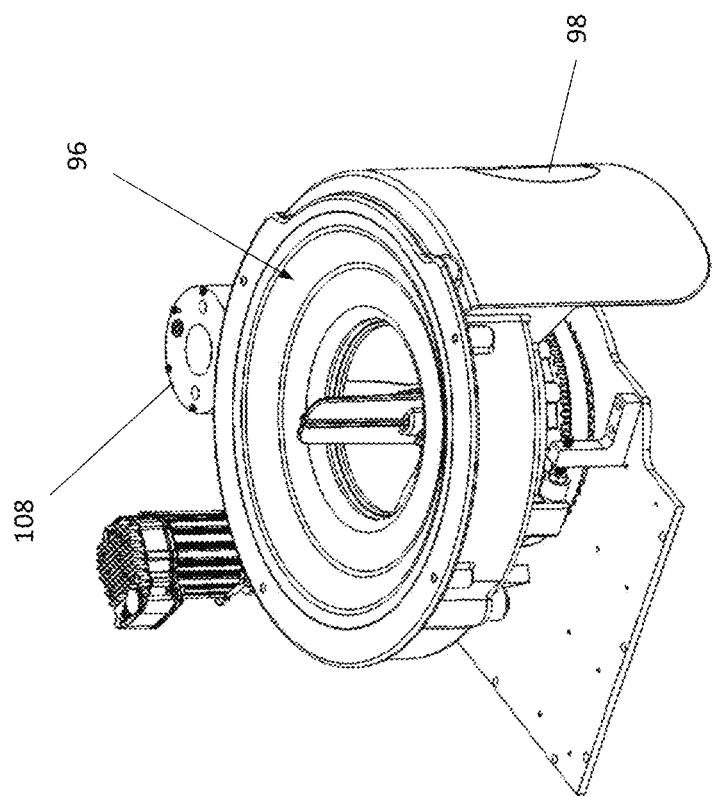
FIG. 16A is a perspective view of an ice shaving assembly in a first position.
FIG. 16B is a perspective view of the ice shaving assembly and a second position.
Figure 16:
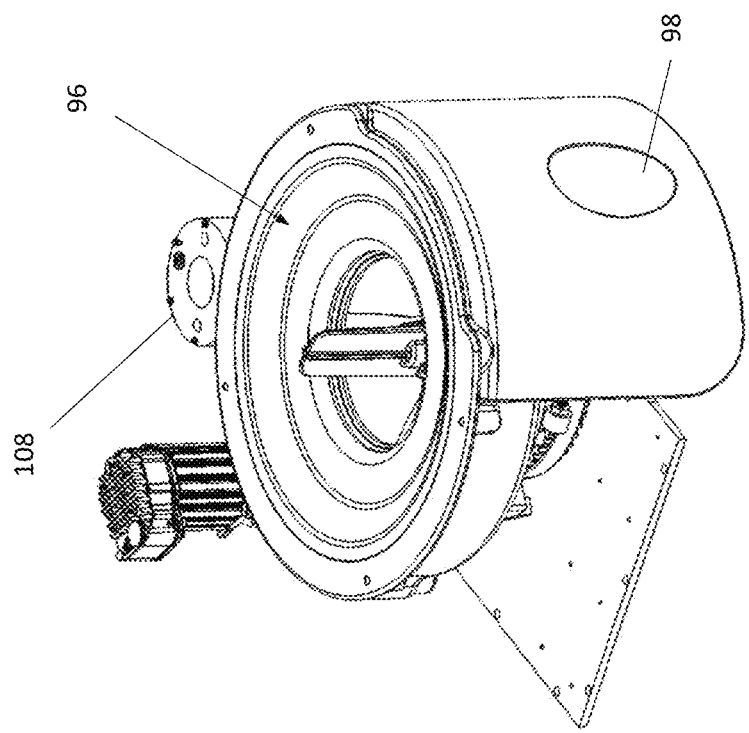

As shown in FIG. 8, the ice shaver 96 includes rotatable blades 106 that are driven by a motor 108 under control of the controller. The shaved ice is deposited into the container 28 by a chute 120 configured to direct the shaved ice into a container which is in one of two positions 40, 42. To be able to dispense shaved ice into a container in either of two positions, the exit port 98 of the ice shaver is movable such that it can align with either of a chute 120 of a first station or a chute 120 of a second station. FIGS. 16A and 16B show the exit port 98 of the ice shaver 96 in two different rotation positions. In a first position, the exit port 98 aligns with an ice chute of a first beverage station, while in a second position, the exit port 98 aligns with an ice chute of a second beverage station. In some embodiments, the exit port 98 may be movable into more than two different positions to dispense shaved ice into containers at several different positions. In some embodiments, instead of rotating the exit port 98, the entire ice shaver assembly may be rotated, or another approach to supplying shaved ice to multiple different positions may be employed.

The arrangement is such that the cubed and shaved ice dispensing assembly 20 is manipulated under the control of the controller to deposit cubed ice into the container 28 at the ice drop position 34 or deposit shaved ice into the container when the container reaches the shaved ice dispensing and blending assembly 24 at the two positions 40, 42 associated with the assembly 24. As with the amount of flavoring dispensed into the container 28, the amount of cubed ice or shaved ice deposited within the container may be selected based on the size of the container and the types of flavors added to the container. In some embodiments, an amount of cubed ice or shaved ice may be determined by an amount of time the cubed and shaved ice dispensing assembly 20 operates. In another embodiment, a weigh scale may be provided to measure the weight of the ice dispensed into the container 28 in a manner described below. When not operating, ice is retained within the ice hopper 94 by the rotatable blades 106 of the ice shaver.

As described above, the ingredient dispenser 22 is configured to dispense a quantity of a flavored product from among a variety of flavored products into the container 28. In some embodiments, the ingredient dispenser 22 is controlled by the controller. The ingredient dispenser 22 may include a pump that is supported by the housing 12 and several tubes or lines that are coupled to the pump to deliver flavored product to a nozzle. In a certain embodiment, containers of flavored fluids or products may be provided at a remote location and connected to one or more nozzles via the inlet connectors 58. In another embodiment, the containers of flavored fluids or products may be disposed within the machine 10 or within a cooling unit upon which the machine 10 rests. The flavor products may be stored in containers, with sensors being provided to indicate when a certain container is empty.

As best shown in FIG. 9, the ingredient dispenser 22 includes two dispense positions 36, 38 to deliver several different types of product to the container 28 when preparing a beverage. For example, the ingredient dispenser 22 may be configured to dispense chilled flavored fluid to the container 28 at dispense position 36. By moving the container 28 with the container movement and positioning assembly 18 to dispense position 38, the ingredient dispenser 22 may be configured to dispense another chilled flavor fluid or some other product, such as a room-temperature product or powdered product, into the beverage container.

Figure 17:
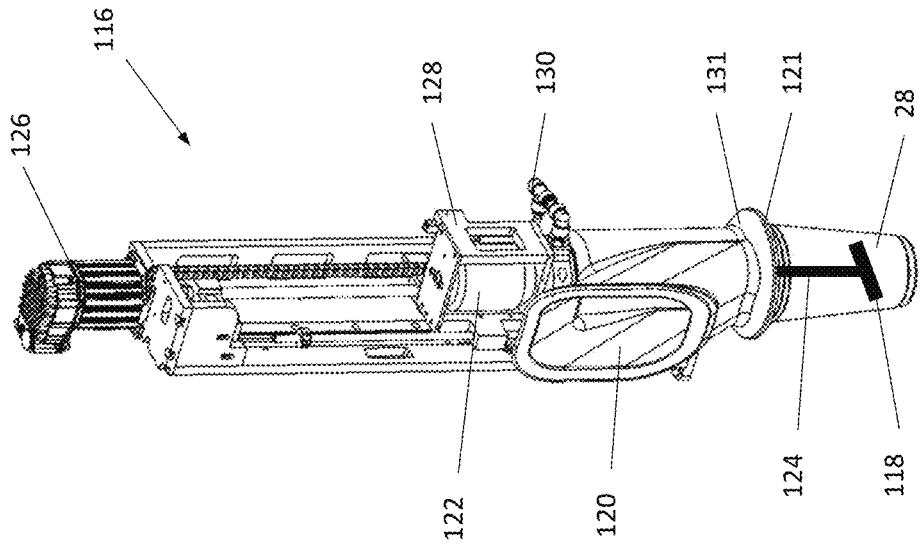
FIG. 17A is a perspective view of a blending assembly shown in a retracted position.
FIG. 17B is a perspective view of the blending assembly shown in an extended position.
Figure 17:
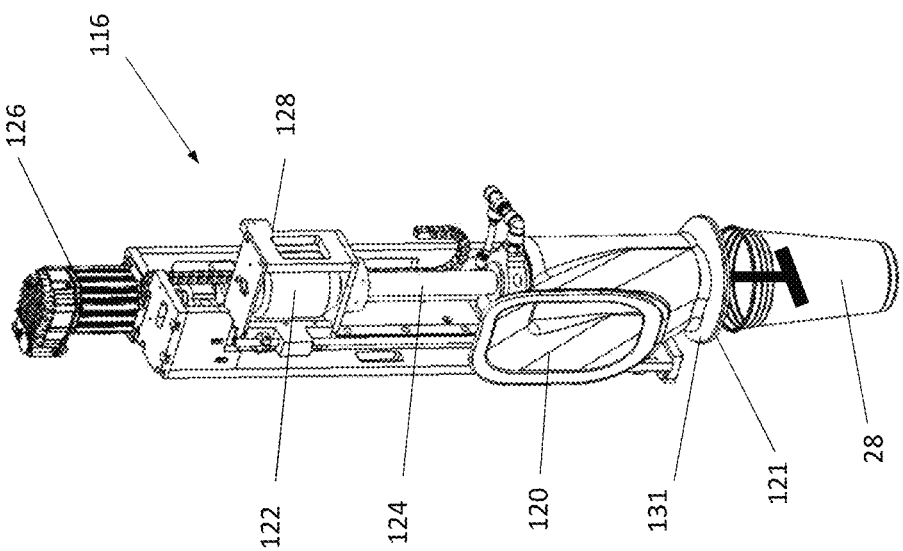

Referring to FIGS. 17A and 17B, the shaved ice dispensing and blending assembly 24 includes a blender drive assembly 116 to drive the operation of blades 118 that are lowered into the beverage container 28 to blend the flavored product and shaved ice in the container.

Although FIGS. 17A and 17B illustrate only one blender drive assembly 116, the beverage preparation machine 10 could include a plurality of blender drive assemblies 116.

As shown, an ice chute 120 may be positioned to add ice to the container 28 with the container positioned in the blend position—without movement of the blender drive assembly or the chute. For example, the ice chute may be connected to the blender drive assembly such that ice exits an exit port 121 through which the blender blades 118 also exit. In this manner, the beverage preparation machine can direct ice (shaved, cubed, or other) from an ice source, such as the ice shaver 96, into the container 28 simultaneous with the operation of a blending step (or other processing step).

The shaved ice dispensing and blending assembly 24 further includes a first motor 122 coupled to a drive shaft 124 that supports the blades 118. The first motor 122 is configured to rotate the drive shaft 124 at a speed to blend the container contents with the blades 118. The shaved ice dispensing and blending assembly 24 may further include a second motor 126 coupled to a carriage 128 to move the drive shaft 124 (and therefore the blades 118) up and down within the container 28.

FIG. 17A shows the blender drive assembly 116 in a raised position, prior to being lowered into the container 28. FIG. 17B shows the blender drive assembly 116 in a lowered position, with the blades 118 of the blender drive assembly 116 within the container 28 to perform a blending operation under the control of the controller. The arrangement is such that when the container 28 is positioned at the shaved ice dispensing and blending assembly 24, the blender drive assembly 116 is lowered by operating the second motor 126. After blending, the blender drive assembly 116 is returned to its raised position, which removes the blades 118 from the container 28.

The entire assembly shown above the container in FIGS. 17A and 17B also may be raised and lowered. That is, FIG. 17A shows the assembly raised such that the container 28 can be places under the assembly. The assembly is then lowered to either contact the container, be in close proximity to the container, or surround the rim of the container. FIG. 17B shows the assembly lowered to meet the upper rim of the container 28. A collar 131 may be pressed lightly against an upper rim of the container 28, or a radially contracting caller may be used to latch on to the container 28.

With this arrangement, ice (whether cubed, shaved, or other) may be added to the container simultaneously with blending of the container contents. In some embodiments, instead of blending, other processing may take place simultaneously with the addition of ice.

The shaved ice dispensing and blending assembly 24 may also include a nozzle disposed within the drive shaft 124 of the blender drive assembly 116. In one embodiment, nozzles are connected to a water supply 130 provided within the housing 12 to perform a rinse and clean operation within the shaved ice dispensing and blending assembly 24, and a drain pan (see FIG. 9) is provided in the machine and to collect the rinsed water from the housing. The drain pan may be configured to collect drainage from the entire machine in some embodiments—including from each beverage station, the ice hopper, and any other portions of the machine that may result in spilled or splashed liquid. During the rinse and clean operation, the drive shaft 124 and the blades 118 of the blender drive assembly 116 may be cleaned as well. Specifically, the blades 118 may be moved downwardly, and water is dispensed from the nozzles to clean the blades of the blender drive assembly 116.

The water used to rinse the drive shaft 124 and the blades 118 of the blender drive assembly 116 drains through the drain port 60 provided in the housing. In some embodiments, the nozzles may be positioned inside a base of the blender drive assembly 116 as a separate assembly. While water is being applied to the drive shaft 124 and blades 118 for rinsing, the blades may simultaneously be spun to improve rinsing effectiveness.

The beverage preparation machine may be configured to perform the rinse and clean operation described above automatically. For example, the controller 17 could control the nozzle to perform the rinse and clean operation every time after a beverage is prepared. Alternatively, the controller 17 could control the nozzle to perform the rinse and clean operation after a predetermined number (merely by way of example, five) of beverage preparation. Alternatively, the controller 17 could control the nozzle to perform the rinse and clean operation after a predetermined amount of time, such as every 24 hours.

Figure 18:
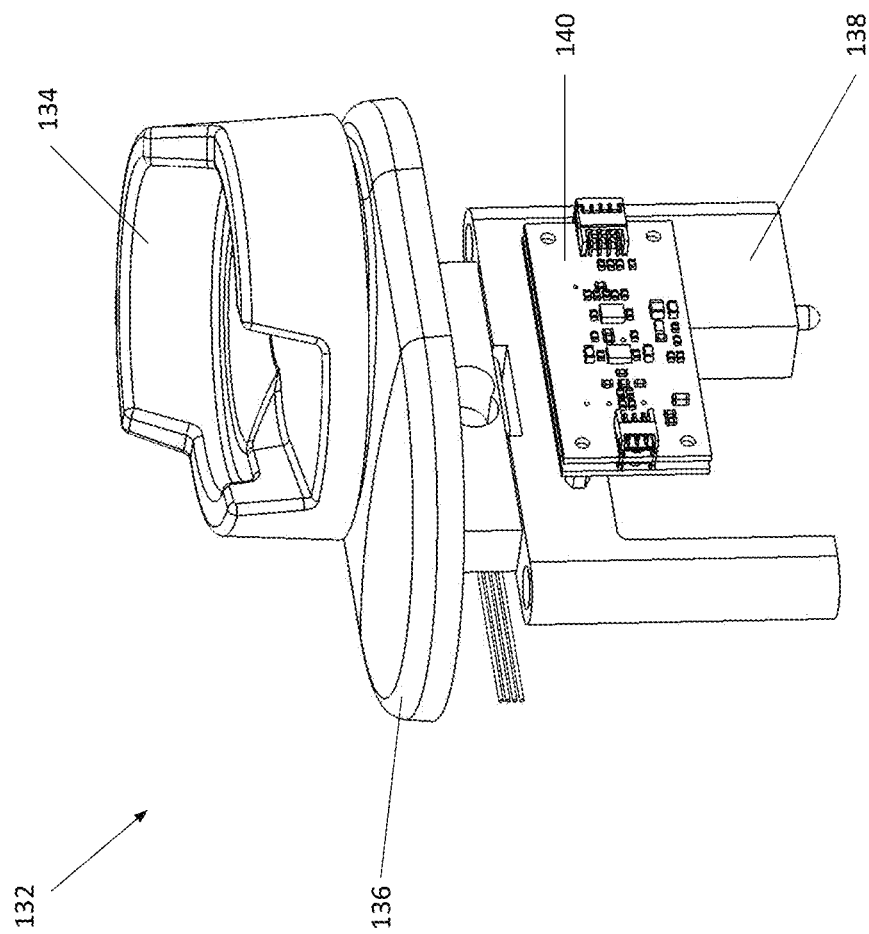
FIG. 18 is a perspective view of a beverage container support assembly.
Figure 19:
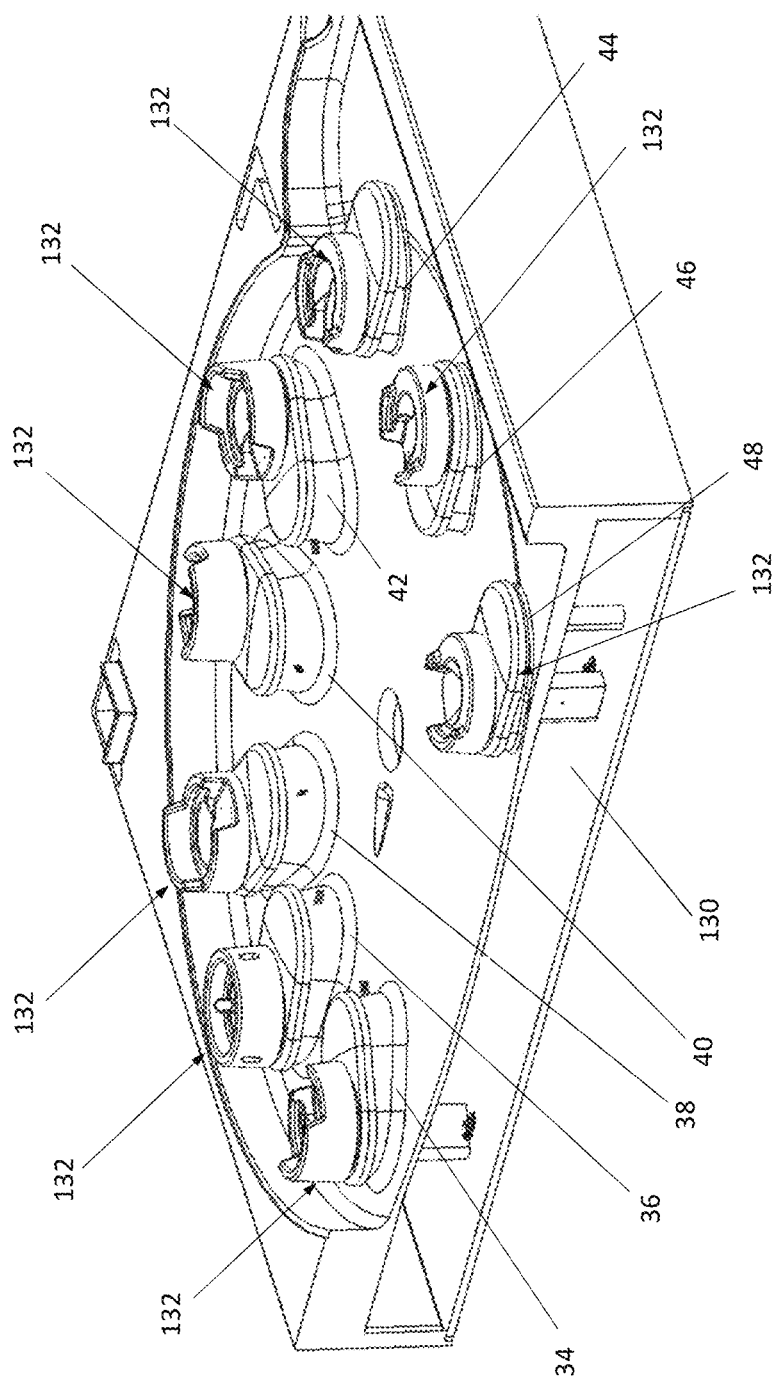
FIG. 19 is a perspective view of beverage container support assemblies.

Referring to FIGS. 18 and 19, the beverage preparation machine 10 includes a plurality of container holders 132 which are configured to support a container at the positions 30, 32, 34, 36, 38, 40, 42, 44, 46, 48 described above. In the illustrated embodiment, the machine 10 may include ten container holders 132. As shown, two container holders 132 are provided at the container drop positions 30, 32 (see FIG. 9) underneath the container dispenser 16, one container holder 132 is provided at the cubed ice drop position 34 underneath the cubed and shaved ice dispensing assembly 20, two container holders 132 are provided at the ingredient dispenser positions 36, 38 underneath the ingredient dispenser 22, two container holders 132 are provided at the at the blending positions 40, 42 underneath the shaved ice dispensing and blending assembly, and three container holders 132 are provided at positions 44, 46, 48 at the container delivery assembly 26.

Each container holder 132 includes a container nest 134, which is designed to receive and support a container 28, and a container platform cover 136, which is designed to support the container nest and secured to the housing by a magnet.

Each container holder may include a weigh scale, which, in some embodiments, includes a load cell mount 138 and a load cell printed circuit board 140 that is coupled to the controller. Each weigh scale may be configured to support and sense a weight of the container 28 and the contents therein. The arrangement may be such that when a container 28 is placed on the container holder 132, the weigh scale is able to weigh the container to determine whether an appropriate amount of ice (cubed or shaved) and/or other ingredients have been deposited into the container. Each container holder could also include a volume sensor that measures an amount of liquid and/or ice inside the container.

In some embodiments, the controller is configured to control the operations of the cubed and shaved ice dispensing assembly 20 and the ingredient dispenser 22 through feedback provided by the weigh scale. For example, the ingredient dispenser may add an ingredient until the weigh scale indicates a pre-selected weight. In some cases, the pre-selected weight may be set as a total weight of the container and its contents as compared to a starting weight of zero. In other embodiments, the pre-selected weight may be based on the starting weight of the container and its contents when the container arrived at the ingredient dispenser. That is, the container may arrive with a weight of 250 grams, and an ingredient may be added until the weight is 275 grams for an ingredient addition of 25 grams. If the container arrived at the ingredient dispenser with a weight of 247 grams, the preselected weight at which to stop adding the ingredient may be set at 272 grams.

The weigh scale is coupled to the controller and measurements may be displayed on the control panel or touch screen 14 to inform the user that the prepared beverage is ready or that an incorrect amount of shaved or cubed ice or other ingredient has been added to the container. The weigh scale may measure weight or mass and be considered a weigh scale or other type of weight sensor.

In some embodiments, the container delivery assembly includes a forwardly projecting platform 142 (see FIGS. 8 and 9) containing the three container holders 132 positioned at positions 44, 46, 48 and several doors 144 provided at the front of the machine adjacent the platform. The doors 144 may include a transparent or translucent panel to permit the user to view the interior of the machine. The doors 144 may be hingedly connected to the housing 12 of the machine 10 to provide access to the interior of the dispenser. The doors 144 may be configured to be maintained in closed positions, e.g., by a spring bias assembly associated with the doors. The doors 144 may be automatically opened by the robotic arm 84 of the container movement and positioning assembly 18 under the control of the controller in some embodiments. For example, arms 197, 198 (see FIG. 22) may be positioned to contact the inside of the doors and push them open when a beverage is being delivered. In other embodiments, the doors 144 may be manually opened by the user, such as an operator or repair person, by applying an opening force to the doors to overcome a force maintaining the doors in the closed position. Sensors may be provided to determine whether the doors 144 are in the opened or closed position.

In some embodiments, one, some, or all of the doors may include a lock to prevent the doors from being opened by a user. For example, a solenoid lock may be used to keep the door locked until a controller unlocks the door for beverage delivery.

While some embodiments illustrated herein show a radial arrangement where a centrally located robotic arm and gripper moves containers between container holders or stations that are radially positioned about a pivot axis of the robotic arm, other arrangements are contemplated. For example, in some embodiments, container holders may be positioned linearly and a gripper moves along a linear drive to pick and place containers. In other embodiments, containers may be held on a carousel, and the carousel may be rotated to position containers under different stations, such as ingredient addition stations and beverage processing stations. In still further embodiments, containers may travel on a conveyor (whether linear or otherwise) between various stations.

Figure 20A:
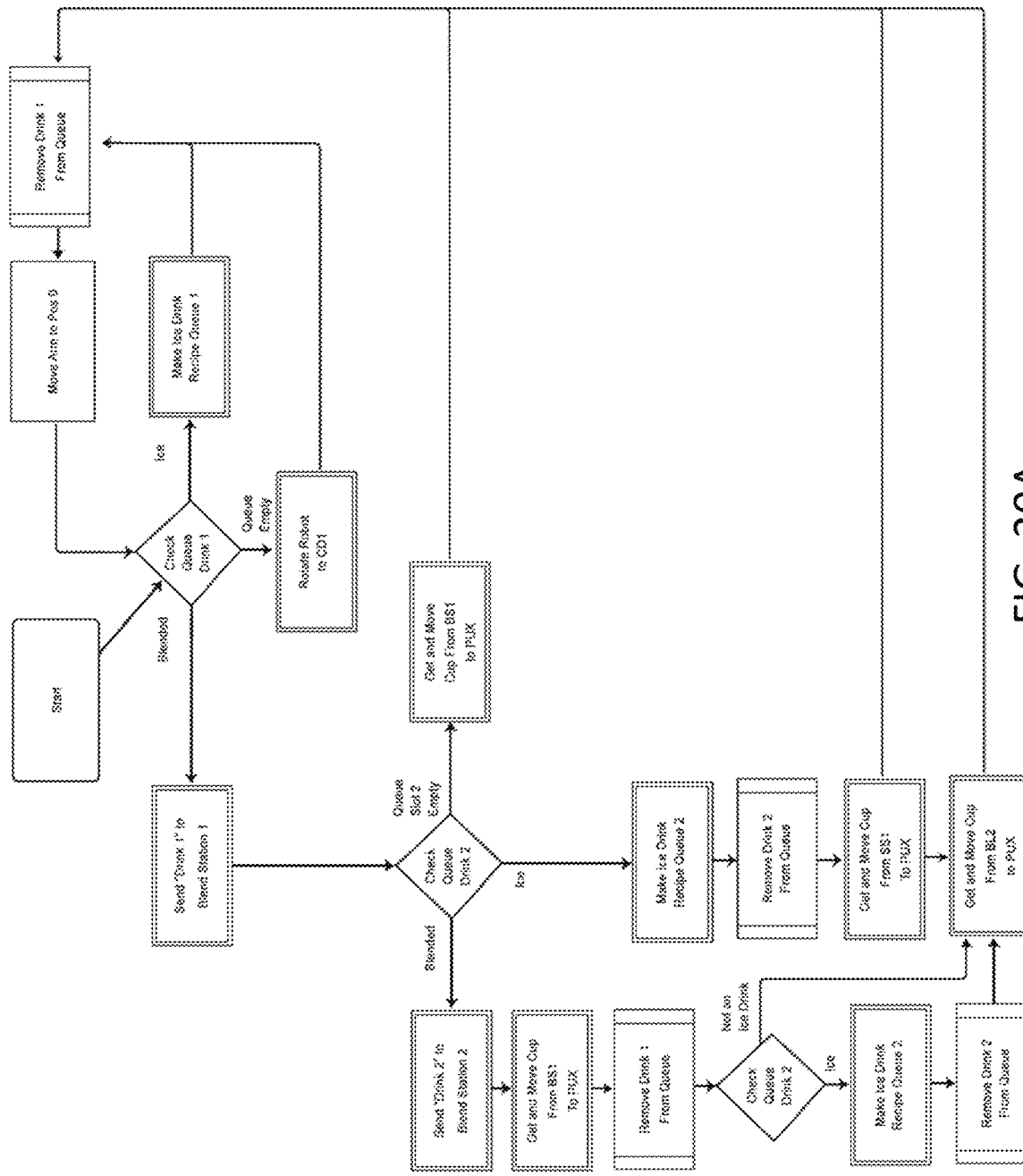
FIG. 20A is a flow chart of one embodiment of operating a beverage preparation machine.
Figure 20B:
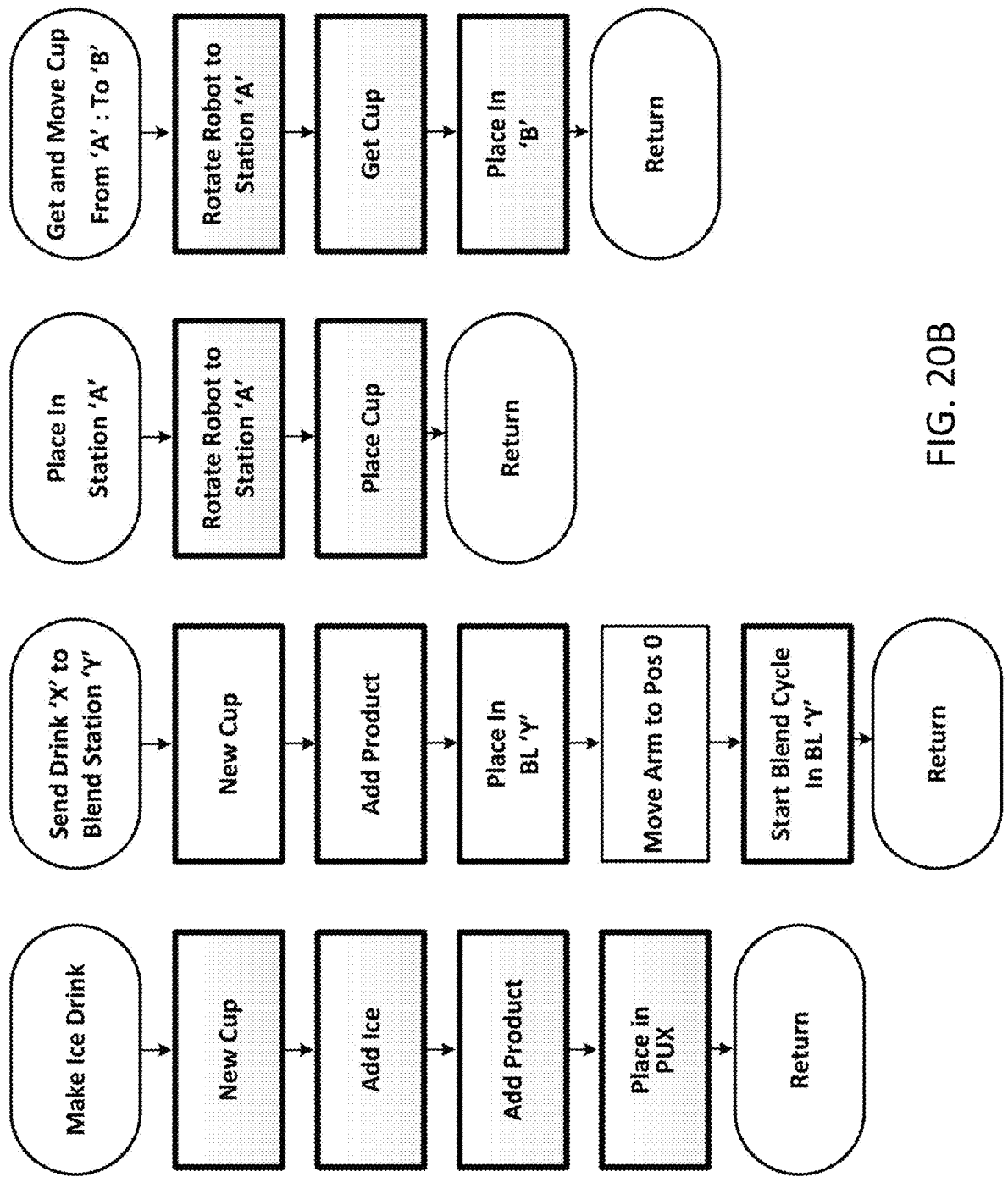
FIG. 20B is a flow chart of one embodiment of operating a beverage preparation machine.

FIG. 20A shows one embodiment of a control sequence for preparing beverages. FIG. 20B shows embodiments of subroutines to complete steps shown in the flow chart of FIG. 20A.

Figure 32:
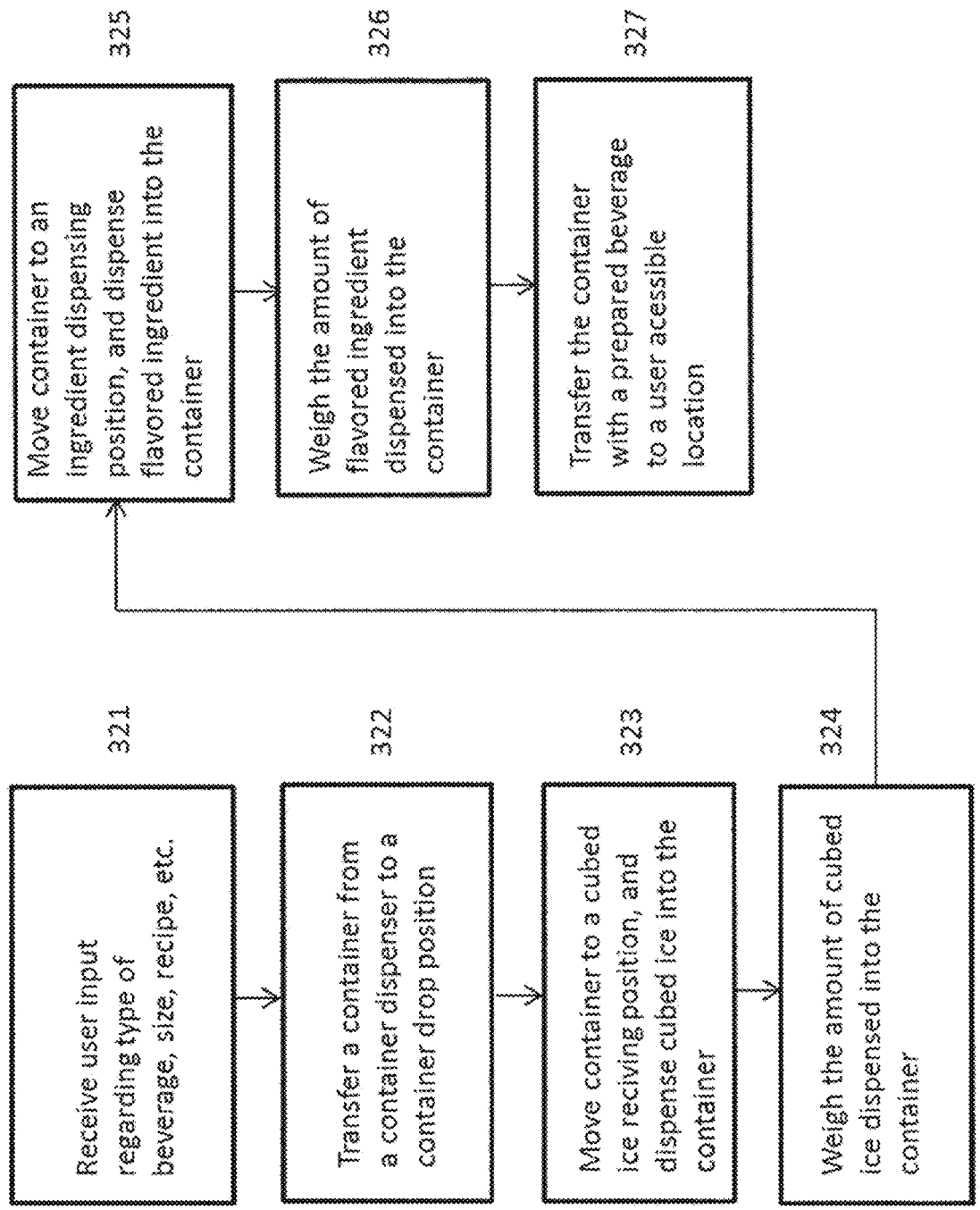
FIG. 32 shows a control algorithm for producing a cubed ice beverage.

FIG. 32 illustrates a control algorithm for controlling the beverage preparation machine to produced an iced beverage according to one embodiment. one embodiment of a method of beverage preparation will now be described. The user may order a desired beverage to be prepared by embodiments of the machine 10 disclosed herein. The user may operate the control panel or touch screen 14 to select a size of beverage to be prepared and the type or types of flavored products to be added to the beverage.

When dispensing an iced beverage, a container 28 is deposited into one of the two container drop positions 30, 32 in step 322. The container 28 is deposited on the container holders 132 from the container dispenser 16 and moved by the container movement and positioning assembly 18 to the container holder associated with the cubed ice drop position 34 in which a predetermined amount of cubed ice is deposited into the container in step 323. The weigh scale of the container holder 132 is provided to facilitate the addition of a proper amount of cubed ice to the container in step 324. Alternatively, the robotic arm 84 could weigh the amount of cubed ice added.

The robotic arm 84 of the container movement and positioning assembly 18 is next rotated to a position in which the container 28 is placed on container holder 132 at one of two positions 36, 38 associated with the cubed and shaved ice dispensing assembly 20, where a predetermined amount of cubed ice is deposited into the container (step 323). The weigh scale of the container holder 132 is provided as part of controlling the amount of cubed ice deposited into the container.

Next, the robotic arm 84 moves the container 28 to one of the two positions 36, 38 associated with the ingredient dispenser 22 in step 325. At the ingredient dispenser 22, a predetermined quantity of a flavored product is dispensed into the container 28. The container is weighed by the weigh scale of the container holder 132 to help control the amount of flavored product or products being added to the container in step 326.

Once a desired quantity of flavored product or products is dispensed into the container 28, the robotic arm 84 moves the beverage container to a container holder 132 at one of three positions 44, 46, 48 associated with the container delivery assembly 26 where the user accesses the prepared beverage in step 327. After the beverage is removed, a rinse and clean operation may be initiated, either automatically or under the control of the user via the control panel or touch screen 14.

Figure 33:
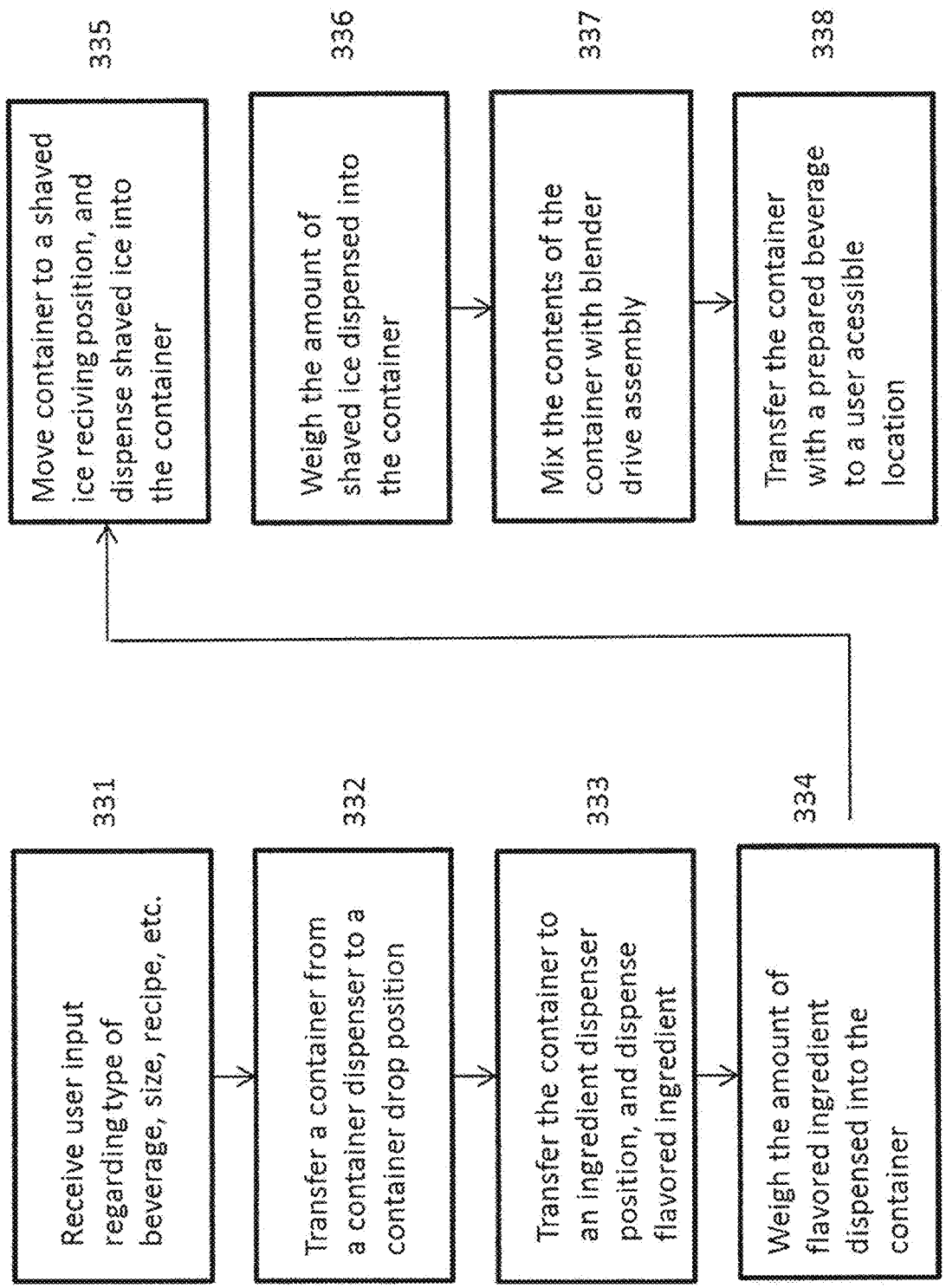
FIG. 33 shows a control algorithm for producing a shaved ice beverage.

FIG. 33 illustrates a control algorithm for controlling the beverage preparation machine to produced a blended beverage according to one embodiment. A user first makes a selection on the beverage preparation machine 10 by interacting with the control panel or touch screen 14 to select a type of beverage, size, particular recipe, or select certain beverage parameters in step 331. When dispensing a blended frozen beverage, a container 28 is deposited into one of the two container drop positions 30, 32 in step 332. The robotic arm 84 of the container movement and positioning assembly 18 is rotated to a position in which the container 28 is placed on a container holder 132 at one of two positions 36, 38 associated with the ingredient dispenser 22 in step 333. At the ingredient dispenser 22, a predetermined quantity of a flavored product is dispensed into the container 28 from a variety of flavored products (step 333). The container and its contents are weighed by the weigh scale of the container holder 132 to facilitate the addition of a correct amount of flavored product or products (step 334).

Once a desired quantity of flavored product or products is added to the container 28, the robotic arm 84 moves the beverage container to a container holder 132 at one of two positions 40, 42 associated with the shaved ice dispensing and blending assembly 24 in step 335, where shaved ice is added. The amount of shaved ice that is added could be weighed by the container holders 132 or the robotic arm 84 of the container movement and positioning assembly 18 (step 336). Next, the contents are mixed in the container 28 by the blades 118 of the blender drive assembly 116 in step 337.

Once the beverage is prepared, in step 338, the robotic arm 84 of the container movement and positioning assembly 18 moves the container 28 to a container holder 132 at one of three positions 44, 46, 48 associated with the container delivery assembly 26 where the user accesses the prepared blended frozen beverage.

In some embodiments, one or more sensors are provided to detect a rotational position of the robotic arm during operation of the machine 10. The sensors may embody an infrared detection system or any other suitable type of sensor.

In some embodiments, an electronics enclosure may be provided to house the electrical components of the machine 10, such as the controller.

Figure 21:
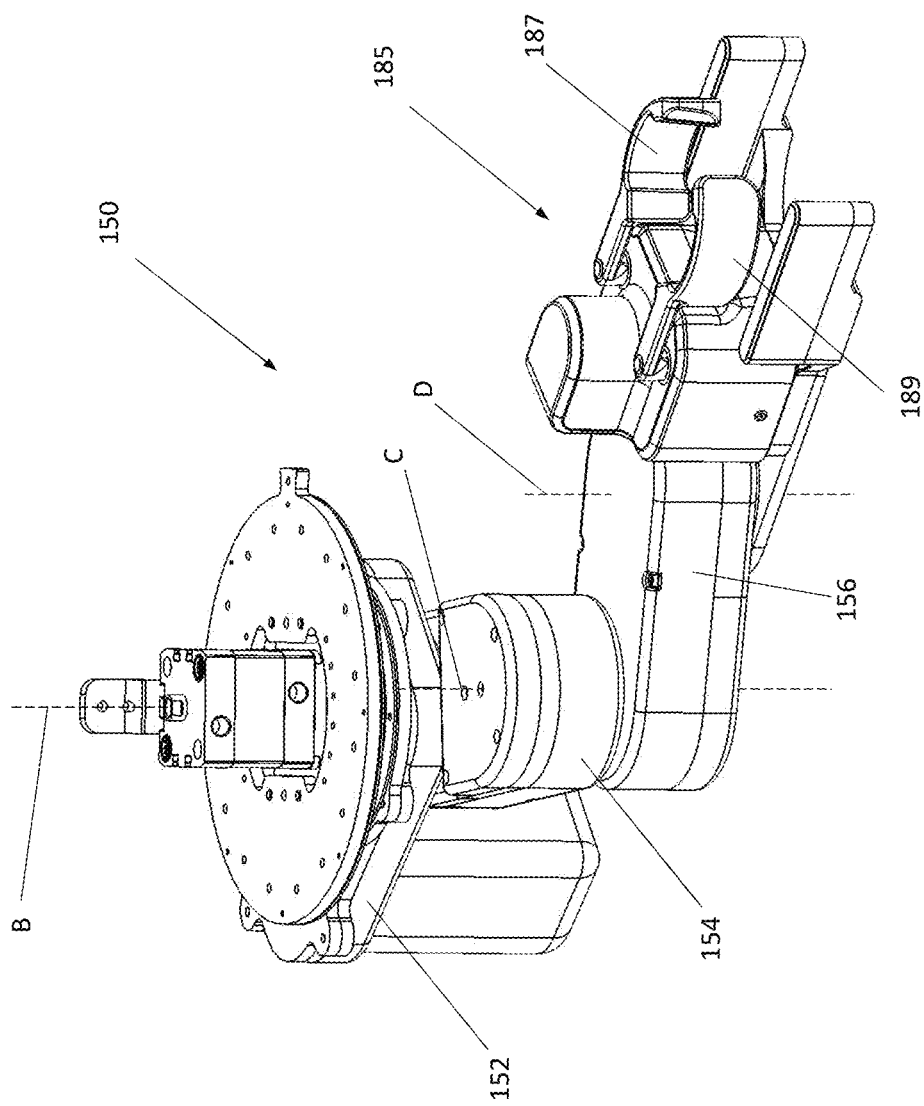
FIG. 21 shows a robotic arm including a gripper according to one embodiment of the disclosure.

FIG. 21 shows one embodiment of a robotic arm 150 which may be used with embodiments disclosed herein. The robotic arm 150 includes a base 152, an inner link 154, an outer link 156, and a gripper 185. The inner link 154 rotates about a vertical axis B relative to the base 152. The outer link 156 rotates about a vertical axis C relative to the inner link 154. The gripper 185 rotates about an vertical axis D relative to the outer link 156. The axes of rotation do not necessarily need to be vertical. Other types of robotic arms or manners of moving beverage containers may be used with embodiments disclosed herein.

With the arrangement shown in FIG. 21, the gripper 185 may be moved radially toward the base 152 to remove a beverage container from a machine station, and may be moved away from the base 152 to place a beverage container at a machine station. To move a beverage container from one station to another, the robotic arm may be retracted from the station, rotate about axis B, and then moved toward a subsequent station. Gripper 185 is shown with two fingers 187, 189 to grip beverage containers, though any suitable gripping arrangement may be used. In some embodiments, containers may be outfitted with an additional piece that provides a convenient grip point for the gripper 185.

Figure 22:
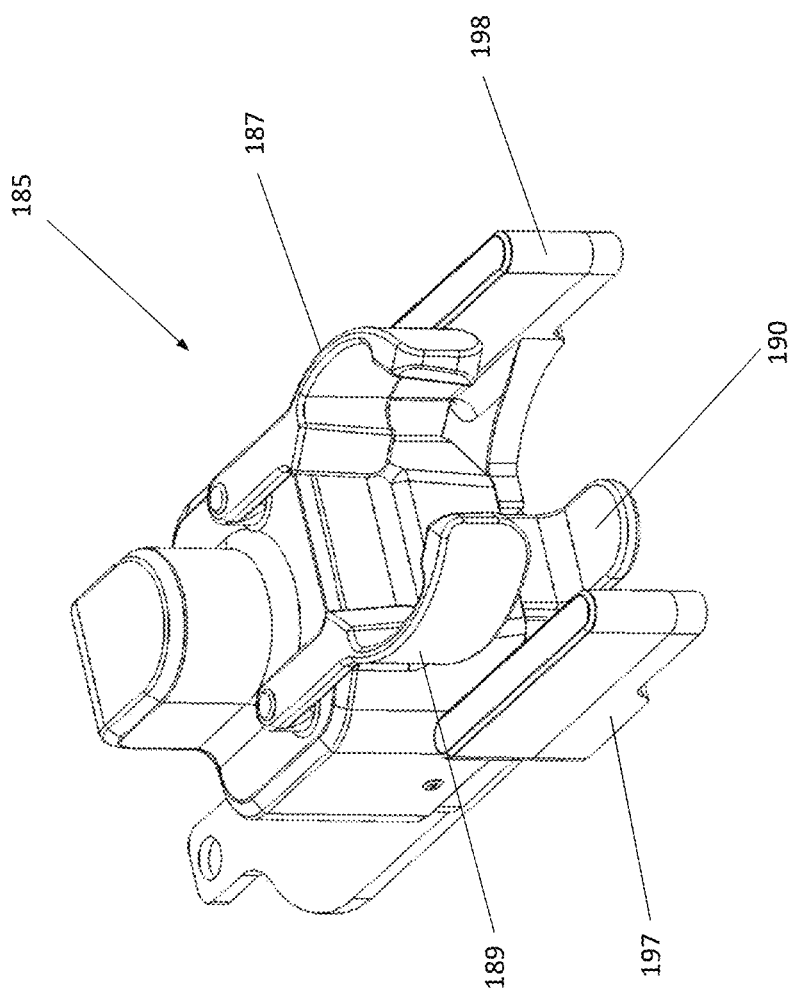
FIG. 22 shows a gripper having a weight sensor arrangement according to one embodiment.
Figure 23:
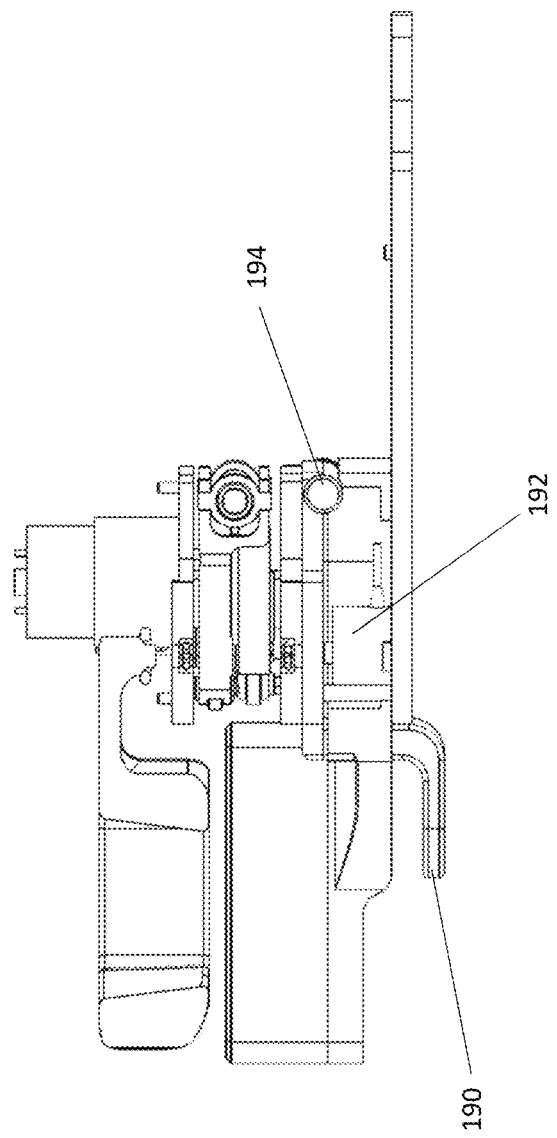
FIG. 23 is a side view of the gripper shown in FIG. 22.

FIG. 22 shows the gripper 185 with a container support 190 that may be used to weigh the container and its contents. For example, as shown in FIG. 23, container support 190 is supported in part by a load cell 192 and allowed to be depressed by the weight of a container via a pivot connection 194 to the overall gripper assembly. By including a weight sensor within the robotic arm, the weight of the container and its contents may be sensed continuously during the beverage preparation process in some embodiments. As compared to a beverage preparation machine having a weight sensor at some or all of the various stations, the provision of a weight sensor within the robotic arm allows the same weight sensor to be used after each station. In this manner, weight measurements throughout the process may be more consistent.

Figure 25:
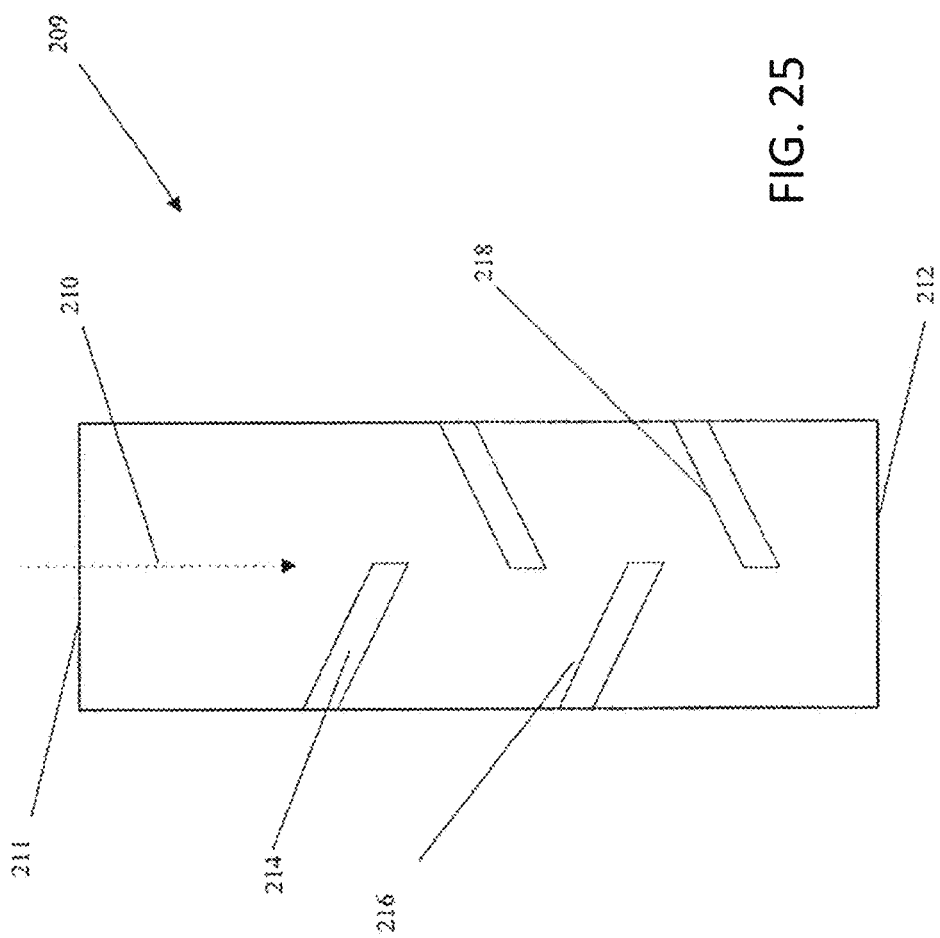
FIG. 25 shows an ice chute according to one embodiment.

An ice chute arrangement which may be used with embodiments disclosed herein, or with other devices not disclosed herein, is shown in FIG. 25. In the embodiment shown in FIG. 25, an ice chute 209 has a longitudinal direction 219 and includes deflectors 214 to slow the ice during its movement from an ice source to a beverage container or other container. By reducing the speed of the ice, splashing or spilling of ingredients that are already in the container may be reduced. Additionally, if cubed ice is being moved into a container without liquid, a slower speed can reduce chipping of the ice.

Ice enters the chute 209 through an ice inlet 211 and exits the chute via an ice outlet 217. Each deflector 214 includes a deflection surface (e.g., deflection surfaces 216,218) which the ice contacts as it falls through the chute. The deflection surfaces are oriented to be transverse to the longitudinal direction 219, and may be angled downwardly and not perpendicular to the longitudinal direction so that the ice is not completely stopped with each drop to the next deflector. Each deflector may be oriented in a different lateral position than the immediately previous deflector. Such an arrangement allows the ice to contact multiple deflectors during its path. For example, upper deflection surface 216 (relative to lower deflection surface 218) may point downwardly and to the right in the view of FIG. 25, and lower deflection surface 218 may point downwardly and to the left. The deflection surfaces do not need to point in opposite directions to be considered as having different directions. For example a deflection surface could point into the drawing sheet in the view of FIG. 25.

Figure 26:
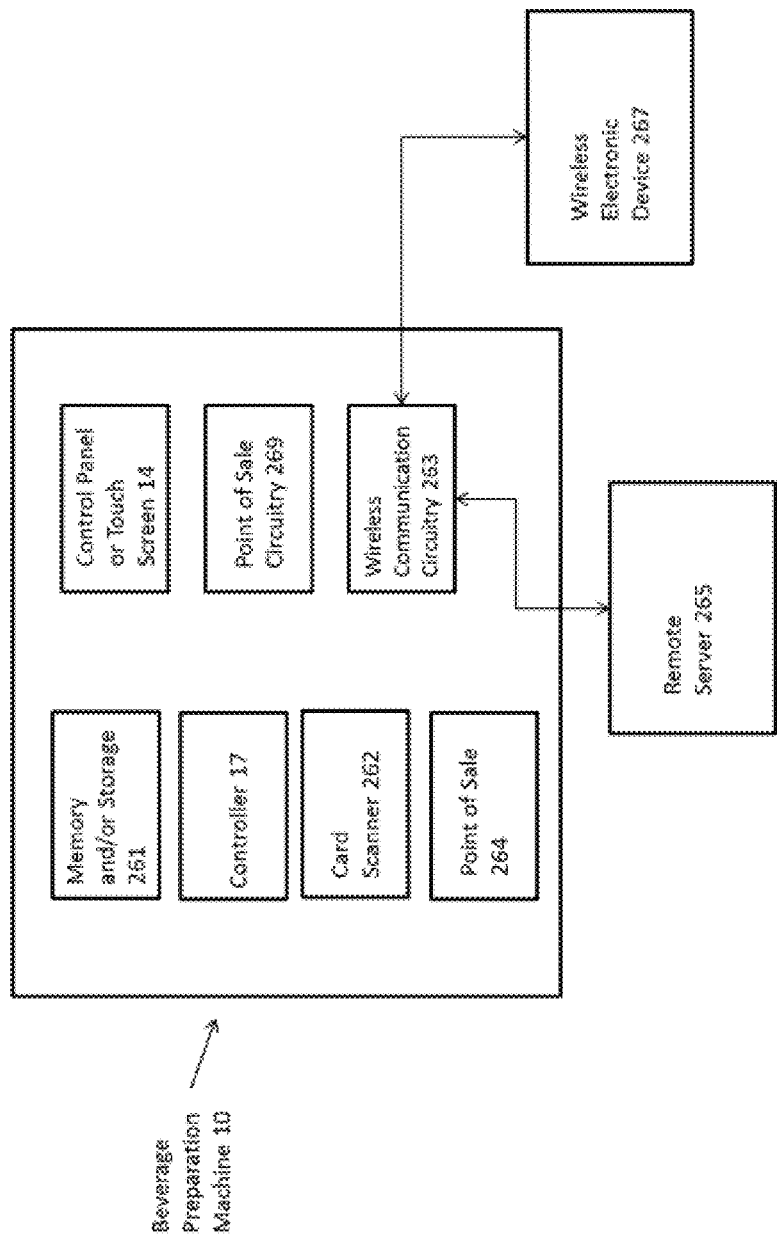
FIG. 26 shows a block diagram of the beverage preparation machine and some of its electronic components.

Reference will now be made to FIGS. 26-30. FIG. 26 shows a block diagram of certain electronic components included in the beverage preparation machine 10. However, these components are exemplary and some of these components could be omitted. The beverage preparation machine 10 includes additional mechanical components, as shown in other figures. As shown in FIG. 26, the beverage preparation machine 10 (also referred to herein as "the system" in some cases) may store recipes in a memory or storage 261 located inside the housing 12. The user could then browse a list of recipes retrieved from the memory or storage 261, and displayed on the control panel or touch screen 14, and select one of the recipes for preparation by the beverage preparation machine. Additionally or alternatively, the beverage preparation machine could access a list of recipes stored in a remote location, such as a remote server 265 performing cloud computing functions or providing services on demand. For example, the beverage preparation machine could include wireless communication circuitry 263 for connecting to the internet via Wi-Fi, 3G, 4G LTE, millimeter waves, or other wireless communication protocols. The beverage preparation machine could then connect to a remote server 265 that stores recipes, download the recipes to the memory or storage 261, and display at least one of the downloaded recipes on the control panel or touch screen 14 for user selection. After a user selects a particular recipe on the control panel or touch screen 14, the beverage preparation machine can produce the selected beverage.

The beverage preparation machine 10 may also include an optical card scanner 262 that can scan a barcode located on a plastic card, where individual consumers are assigned a specific card with a specific barcode number.

The beverage preparation machine could also receive recipes (or instructions to download recipes) from a user's electronic device 267, such as a smartphone, tablet, laptop computer, desktop computer, wearable electronic device, etc that includes wireless communication circuitry for communicating with the beverage preparation machine 10. For example, a user could browse a list of recipes displayed on the electronic device 267, select a particular recipe, and then control the electronic device to either transmit the selected recipe to the beverage preparation machine, or control the electronic device to send an instruction to the beverage preparation machine to download the selected recipe from a remote location such as a remote server. In some embodiments, the user could download an app to the electronic device that includes predetermined recipes. The ability to access recipes stored in a remote location (such as remote server 265 or electronic device 267) expands the range of beverages that the beverage preparation machine can produce.

Referring to FIG. 26, the beverage preparation machine 10 could also include a point of sale system 264 that is either integrated with the beverage preparation machine, or remotely located with respect to the beverage preparation machine. If the point of sale system is remotely located, the point of sale system could include wireless communication circuitry for communication with the beverage preparation machine wirelessly, and the beverage preparation machine could include similar wireless communication circuitry. The system may be configured so that the beverage preparation machine prepares a beverage automatically after payment has been processed by the point of sale system. For example, if a user pays for a vanilla smoothie, after payment is confirmed, the beverage preparation machine can prepare the vanilla smoothie according to a predetermined recipe, automatically and without further user input.

The point of sale system 264 could comprise a credit card reader such as a reader that is configured to read magnetic stripes, or a reader that is configured to read chip and pin type credit cards, or both. The point of sale system could also include a display and a numeric keypad for entering PIN numbers. The point of sale system could also include a card scanner that is capable of scanning a loyalty card that a bar code imprinted onto the loyalty card. The loyalty card may have a serial number, and the memory or storage may include a database that associates serial numbers with specific customers and/or specific customer accounts.

Figure 27:
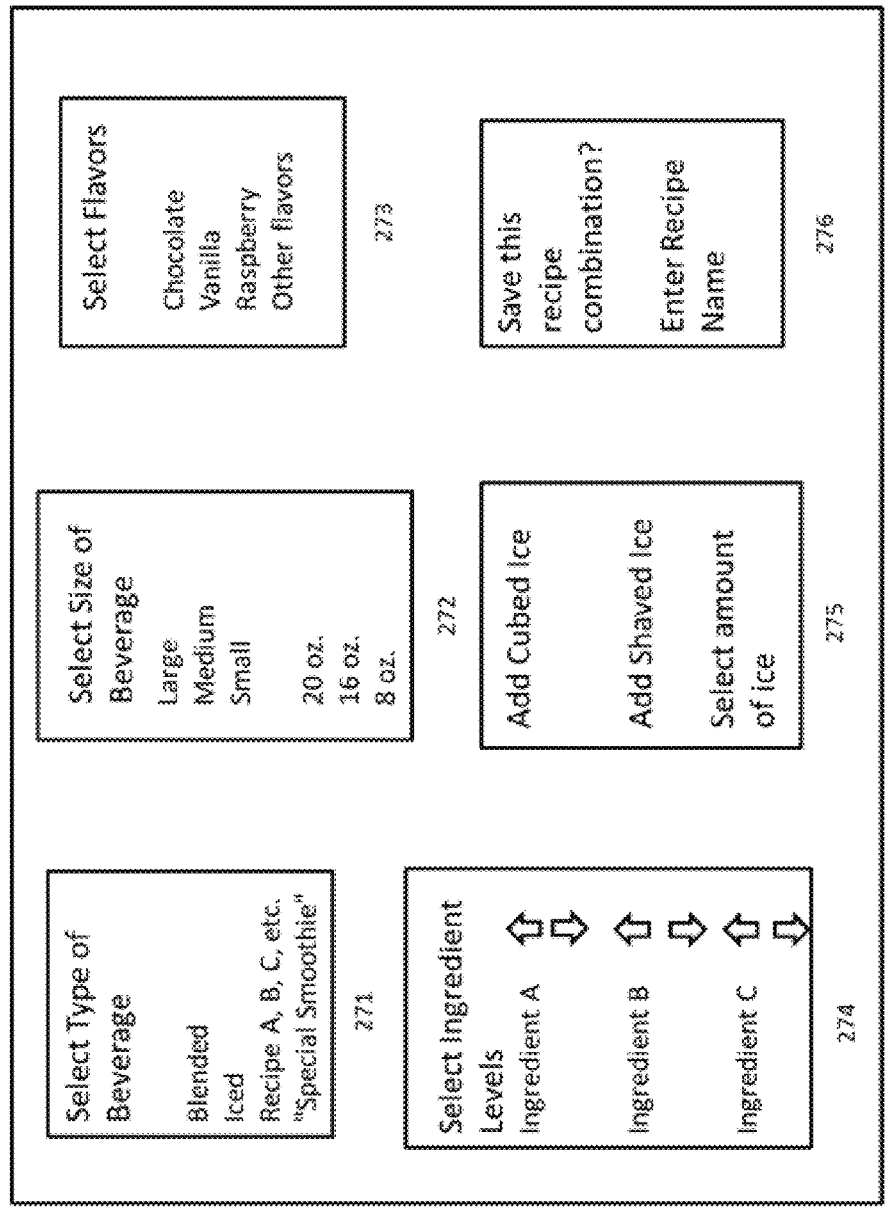
FIG. 27 shows a screen displayed on the control panel or touch screen with beverage parameters/options.

Referring to FIG. 27, a the control panel or touch screen 14 may display a user interface that allows a user to select at least one of: a type of beverage 271, a size of the beverage 272, at least one of a plurality of flavors 273, amounts of various ingredients in the beverage 274, and types of ice, and/or amounts of ice 275. The control panel or touch screen 14 may display the type of beverage, size, flavor, ice amounts/types, and ingredients on a single screen, as shown in FIG. 27.

As shown in FIG. 27, a user may select a variety of types of beverages for the beverage preparation machine to produce on screen 271. For example, a user may select a blended beverage, or an iced beverage that includes cubed or shaved ice, or a beverage that is both blended and includes cubed or shaved ice, by interacting with the control panel or touch screen 14. A user could also select a recipe that is stored in the memory or storage 261.

Referring to FIG. 27, a user may also select a size of a drink on screen 272. In one embodiment, the beverage preparation machine can provide small, medium, or large size beverages. In another embodiment, a user may select a beverage of a specific quantity, such as 12 fluid ounces, 16 fluid ounces, or 20 fluid ounces. The sizes available to the user may correspond to the size of cups that are stored inside the beverage preparation machine. For example, if the beverage preparation machine stores 8 ounce cups and 10 ounce cups, the control panel or touch screen 14 can display options for an 8 ounce beverage and a 10 ounce beverage.

Referring to FIG. 27, a user may also select at least one of a plurality of flavors on screen 273. As described in further detail below, the ingredient dispenser 22 is configured to dispense one or more ingredients into the container 28. These ingredients may be flavored. The flavor products may be stored in containers. Merely by way of example, the containers could store flavors such as chocolate flavor, vanilla flavor, and raspberry flavor. As a result, a user could create a beverage that includes chocolate flavor, or chocolate flavor in combination with raspberry flavor. Other flavor combinations are possible. As long as the beverage preparation machine has the flavors stored inside, a user could create a beverage that includes any number of combinations of the stored flavors.

Referring to FIG. 27, a user may also control an amount of various ingredients that are added to a beverage on screen 274. For example, suppose a user selects a recipe stored in a memory or storage. If the recipe comprises ingredients A, B, and C, the user may wish to increase an amount of ingredient C, if the user has a particular taste for ingredient C. Alternatively, the user could decrease an amount of ingredient C, if the user dislikes ingredient C. According to another embodiment, the user could increase or decrease an amount of sugar in the prepared beverage.

Referring to FIG. 27, a user may also control an amount or type of ice that is added to a beverage on screen 275. For example, the beverage preparation machine can produce shaved ice or dispense cubed ice. A user could select one of these ice types and control the beverage preparation machine to add one of these types of ice to the beverage being produced. Additionally, the user could control an amount of shaved or cubed ice that is added to the beverage being produced. For example, a user could select a small, medium, or large amount of shaved or cubed ice. Alternatively, the user could select a specific quantity of shaved or cubed ice, such any value between 4-8 ounces, though other specific amounts of ice are feasible.

In some embodiments, the beverage preparation machine could automatically determine an amount of cubed or shaved ice to add, based on the size of the beverage that is selected by the user, and/or other variables such as the type of beverage, the specific recipe that is selected, and/or ingredient levels. In order to facilitate automatically calculating ice amounts, the memory or storage 261 could include a database that includes specific amounts of ice for various beverages or ingredient combinations. For example, a medium beverage according to recipe A may require 4 oz. of shaved ice. A large beverage according to recipe B may require 6 oz. of cubed ice. Alternatively, the beverage preparation machine could simply automatically dispense an amount of cubed or shaved ice based on the size of the container. For example, a large beverage could require 8 ounces of cubed or shaved ice, and a small beverage could require 4 ounces of cubed or shaved ice.

Figure 28:
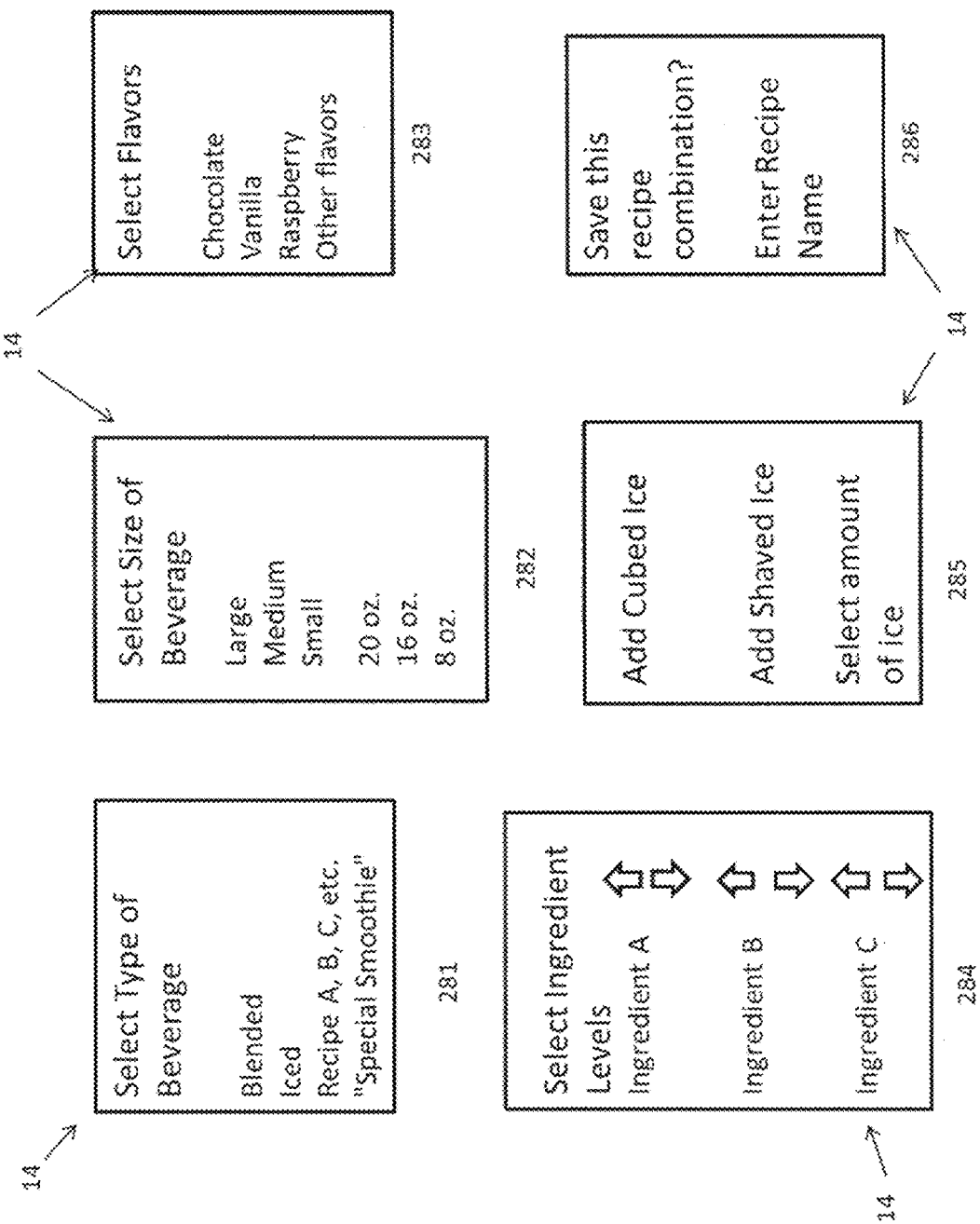
FIG. 28 shows a series of screens displayed on the control panel or touch screen with beverage parameters/options.
Figure 29:
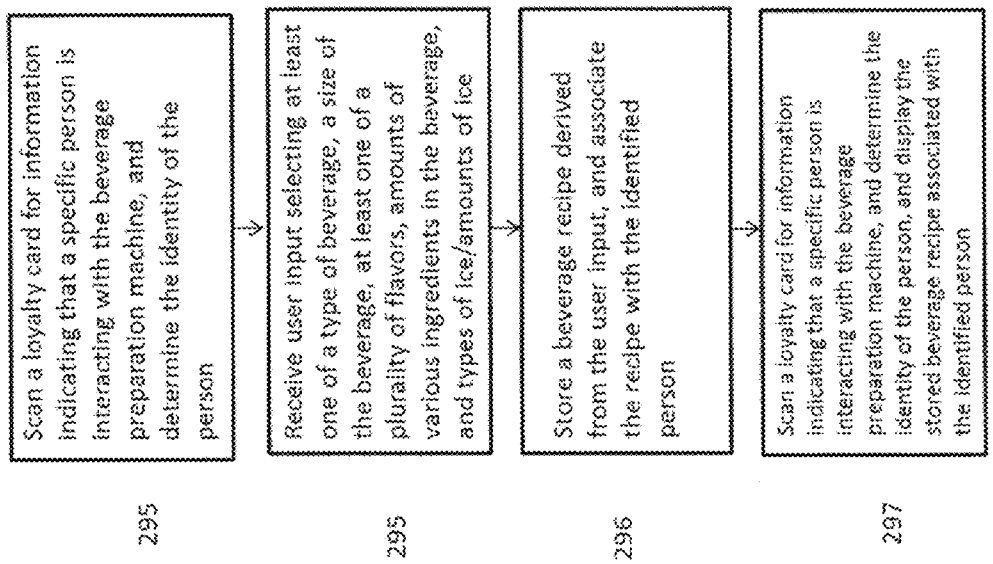
FIG. 29A shows a flowchart for storing recipes on an electronic device for later use.
FIG. 29B shows a flowchart for storing recipes in a manner that associates specific recipes with specific persons.
Figure 29:
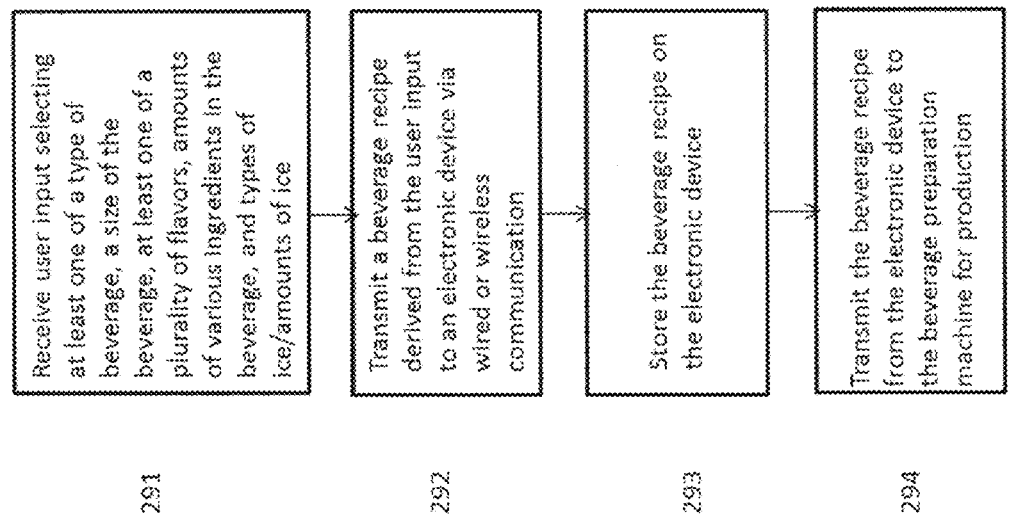

Referring to FIG. 28, the control panel or touch screen 14 could also display the type of beverage 281, the size of the beverage 282, at least one of a plurality of flavors 283, the amounts of various ingredients in the beverage 284, the types of ice, and/or amounts of ice, et cetera 285, and the recipe save option 286 in a full screen mode, on different screens sequentially, so as to guide a user through various steps of beverage creation/recipe modification. It may be advantageous to provide each set of options on different screens that are shown sequentially when the display is somewhat small. For example, if the display is relatively small, the display would have to show the layout in FIG. 27 in a very small font in order to fit all options on a single screen. As a result, the display could show only one of each set of options at a time, in a full screen mode, in a larger font that is more readable, and progress to the next set of options after a user makes a selection.

Although FIGS. 27 and 28 illustrate the control panel or touch screen 14 on the beverage preparation machine displaying the beverage options for a user, the beverage options could also be displayed on the electronic device 267. In such a case, the electronic device 267 would be in communication, preferably wirelessly, but potentially via wires, with the beverage preparation machine. The user would go through the menus shown in FIG. 27 or 28, and the electronic device would transmit instructions to the beverage preparation machine to produce the desired beverage. Thus a user could create the beverage by interacting primarily with the electronic device 267 rather than the beverage preparation machine 10.

Referring to FIG. 29A, the system can also store customized beverage recipes on an electronic device owned by a user. The advantage of this feature is that a user can prevent the need to recreate a customized recipe form scratch each time the user wishes to consume the customized recipe. As shown in FIG. 29A, in step 291, a user can first interact with the beverage preparation machine 10 by selecting/inputting at least one of a type of beverage, a size of the beverage, at least one of a plurality of flavors, amounts of various ingredients in the beverage, and types of ice/amounts of ice, as described above. Subsequently, in step 292, the system can then transmit the beverage recipe derived from the user input to an electronic device via wired or wireless communication (See FIG. 26). Subsequently, in step 293, the electronic device can store the beverage recipe. Subsequently, in step 294, at a later time, a user can control the electronic device to transmit the previously created beverage recipe to the beverage preparation machine 10. In such a case, the user does not need to enter in all of the previously selected beverage parameters (type of beverage, size, etc.). Instead, the beverage preparation machine 10 can begin producing the beverage after receiving the beverage recipe from the electronic device.

Referring to FIG. 29B, the system can also store customized beverage recipes that are associated with specific customers. In this embodiment, the system includes an optical card scanner 262 (see FIG. 26) that can scan barcodes. When a user approaches the system, the user presents a loyalty card so that the scanner can read the barcode on the loyalty card. The system includes stored information that corresponds the information on the barcode with a specific person. In this manner, the system can identify the person who presents the loyalty card in step 294. Subsequently, the user can input/select at least one of a type of beverage, a size of the beverage, at least one of a plurality of flavors, amounts of various ingredients in the beverage, and types of ice/amounts of ice in step 295. Subsequently, the system can store a beverage recipe derived from the user input, and associate the recipe with the identified person in step 296. As a result, the next time the user interacts with the system, the user will again present the loyalty card for scanning by the optical card scanner 262. The system can then, in step 297, display the stored customized beverage recipe for the user, so that the user can consume/produce the customized beverage without having to recreate the beverage from scratch or enter in the same inputs a second time. This saves time and increases convenience.

Referring to FIG. 30, the beverage preparation machine 10 may also store customized recipes created by a user. For example, a user first selects at least one of a type of beverage, a beverage size, at least one flavor, ice amounts/type, and/or an amount of an ingredient in step 301. Subsequently, the user may select a button (276 in FIG. 27, 286 in FIG. 28) on the control panel or touch screen 14 that saves/stores the customized recipe to the memory or storage 261 located inside the housing 12 in step 302. In step 302, the user could also assign a name to the saved customized recipe, such as "Special Smoothie." The control panel or touch screen 14 could also display a keyboard to facilitate entering in a specific name for the customized recipe in step 302.

In step 303, the system can display the stored/saved beverage recipe at a later time, so that a user would then be able to control the beverage preparation machine to produce the customized recipe more quickly by simply selecting the saved customized recipe entitled "Special Smoothie" (see FIGS. 27 and 28) from a menu on the control panel or touch screen 14, rather than going through the process of re-creating the user's preferred beverage from scratch each time the user wishes to consume their customized beverage.

Alternatively, the user could access recipes that are locally stored in the beverage preparation machine, modify the aspects of the recipes to suit the user's particular preference, such as ingredient levels, or ice types/amounts, and store the modified recipe in the memory or storage.

Figure 31:
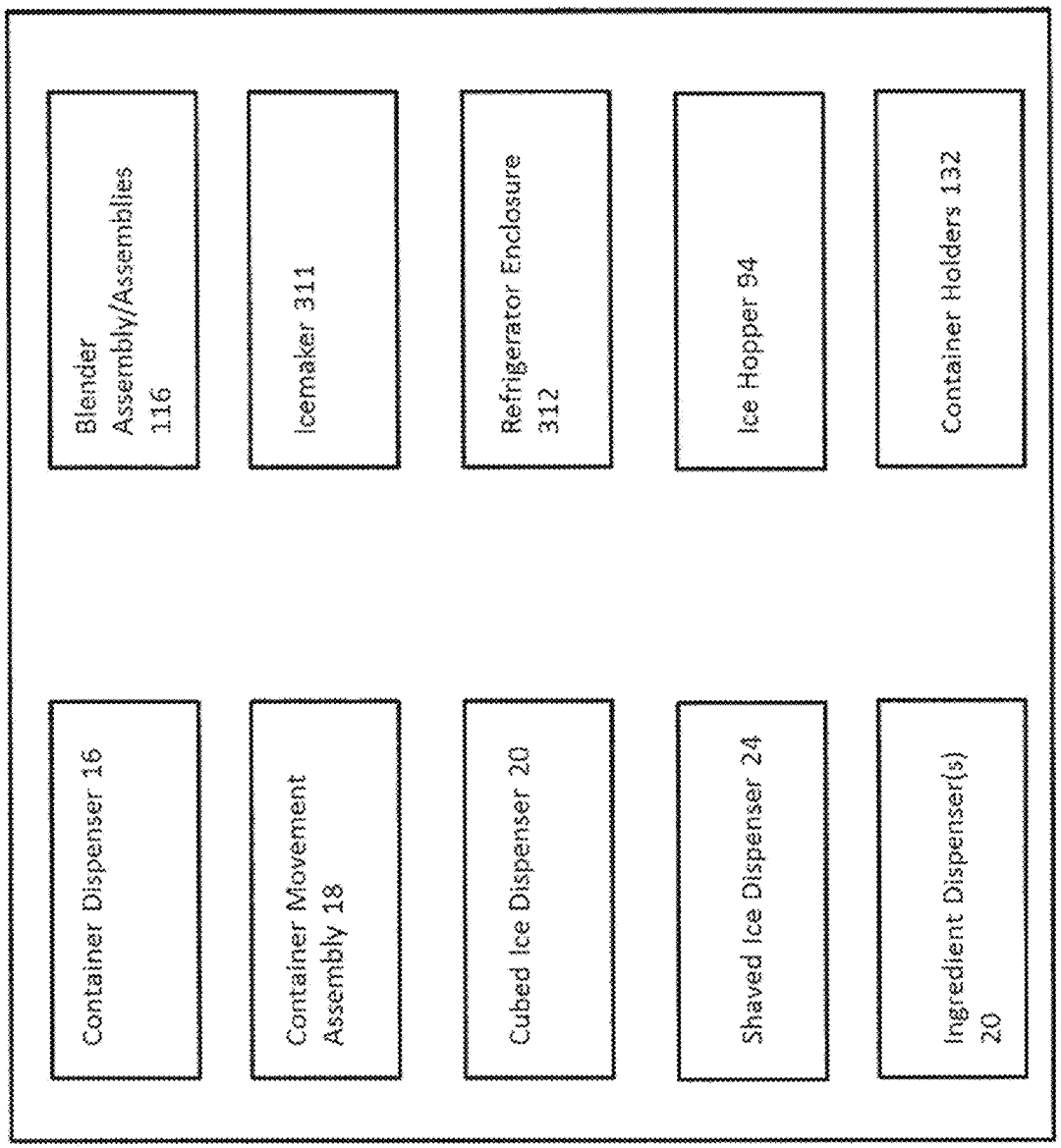
FIG. 31 shows a block diagram of the beverage preparation machine and some of its mechanical components.

FIG. 31 illustrates a block diagram of certain mechanical components of the beverage preparation machine 10. However, these components are exemplary and some of these components could be omitted. The container dispenser 16, the container movement assembly 18, the cubed ice dispenser 20, the shaved ice dispenser 24, the ingredient dispenser(s) 20, the blender assembly/assemblies/116, ice hopper 94, and container holders 132 have all been previously described.

The beverage preparation machine 10 may include an icemaker 311, which generates ice for the cubed ice dispenser 20 and the shaved ice dispenser 24. The icemaker could be located on top of the beverage preparation machine 10 so that ice could be routed to either the cubed ice dispenser 20 or the shaved ice dispenser 24.

The beverage preparation machine 10 may include a refrigerator enclosure 312. The refrigerator enclosure could be located beneath the other components of the beverage preparation machine 10 so to form a refrigerated base. The refrigerator enclosure 312 could store chilled ingredients or prepared beverages after production.

The controllers of the above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with non-dedicated hardware (e.g., one or more processors) that is programmed using microcode or software to perform the functions recited above.

In this respect, it should be appreciated that one implementation comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs above-discussed functions. The computer-readable storage medium can be transportable such that the program stored thereon can be loaded onto any computer resource to implement functionality discussed herein. In addition, it should be appreciated that the reference to a computer program which, when executed, performs the above-discussed functions, is not limited to an application program running on a host computer. Rather, the term "computer program" is used herein in a generic sense to reference any type of computer code (e.g., software or microcode) that can be employed to program one or more processors to implement above-discussed techniques.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Several embodiments having been described in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method of operating a beverage preparation machine, wherein the beverage machine comprises a plurality of stations, comprising:
   one or more container supply stations for storing a plurality of containers;
   a plurality of beverage preparation stations, including an ingredient dispensing station and a processing station, the processing station comprising a blade to mix or blend ingredients within the containers; and
   one or more user accessible stations for accessing a prepared beverage,
   wherein the plurality of stations are disposed in a generally circular arrangement;
   wherein the beverage machine further comprises a robotic arm, rotatable about an axis within the circular arrangement; and a gripper at a distal end of the robotic arm,
   wherein the robotic arm and the gripper are configured to selectively position the containers at one or more of the plurality of stations;
wherein the method comprises:
   selecting a type of beverage to be prepared;
   moving, along a first arcuate path, a container with the robotic arm from the one or more container supply stations to the ingredient dispensing station and dispensing an amount of an ingredient in the container;
   moving, along a second arcuate path, the container with the robotic arm to the processing station and processing the ingredient with the blade; and
   moving the container with the robotic arm from the processing station to one of the one or more user accessible stations.

2. The method according to claim 1, wherein
the dispensing comprises controlling the dispensing of the amount by volume or weight by using a volume sensor or a weight sensor.

3. The method according to claim 1, wherein
the dispensing comprises controlling the dispensing of the amount by weight by using the weight sensor, and
the robotic arm includes the weight sensor.

\* \* \* \* \*